(12) United States Patent
Fleegal

(10) Patent No.: US 7,363,619 B2
(45) Date of Patent: Apr. 22, 2008

(54) API SCHEMA LANGUAGE AND TRANSFORMATION TECHNIQUES

(75) Inventor: Eric B. Fleegal, Renton, WA (US)

(73) Assignee: Microsoft Corporation, Remond, WA (US)

( * ) Notice: Subject to any disclaimer, the term of this patent is extended or adjusted under 35 U.S.C. 154(b) by 545 days.

(21) Appl. No.: 11/038,548

(22) Filed: Jan. 19, 2005

(65) Prior Publication Data

US 2005/0125778 A1   Jun. 9, 2005

Related U.S. Application Data

(62) Division of application No. 10/076,667, filed on Feb. 14, 2002.

(51) Int. Cl.
*G06F 9/44* (2006.01)
*G06F 7/00* (2006.01)

(52) U.S. Cl. ...................... 717/137; 719/328

(58) Field of Classification Search ........... 717/136, 717/137
See application file for complete search history.

(56) References Cited

U.S. PATENT DOCUMENTS

| | | | | |
|---|---|---|---|---|
| 5,675,805 A | * | 10/1997 | Boldo et al. ............. | 717/114 |
| 5,974,256 A | | 10/1999 | Matthews et al. | |
| 6,026,238 A | | 2/2000 | Bond et al. | |
| 6,052,527 A | | 4/2000 | Delcourt et al. | |
| 6,066,181 A | * | 5/2000 | DeMaster ............... | 717/148 |
| 6,324,681 B1 | * | 11/2001 | Sebesta et al. ........... | 717/102 |
| 6,468,160 B2 | | 10/2002 | Eliott | |
| 6,712,704 B2 | | 3/2004 | Eliott | |
| 6,769,989 B2 | | 8/2004 | Smith et al. | |
| 6,836,857 B2 | | 12/2004 | Ten-Hove et al. | |
| 7,207,046 B1 | * | 4/2007 | Van Gerrevink ........... | 719/313 |
| 7,284,240 B1 | | 10/2007 | Fleegal | |
| 2001/0056504 A1 | | 12/2001 | Kuznetsov | |
| 2004/0015898 A1 | | 1/2004 | Tewksbary | |
| 2004/0162137 A1 | | 8/2004 | Eliott | |

OTHER PUBLICATIONS

H. Arno Jacobsen and Bernd J. Krämer, "Modeling Interface Definition Language Extensions," proc. 37th Int'l Conf. on Technology of Object-Oriented Languages and Systems, 2000, TOOLS-Pacific 2000, pp. 242-251.*
Al Major, "COM IDL & Interface Design," Wrox Press, 1999, pp. 9-50.*
Phillip Merrick and Charles Allen, "Web Interface Definition Language (WIDL)," 1997, W3C, NOTE-widl-970922, 14 pages.*
Microsoft Corporation and Digital Equipment Corporation, "The Component Object Model Specification", Oct. 24, 1995, Version 0.9, pp. 1-10.
Frank, M. , "Gaudi Detector Description", <<lhcbproject.web.cern.ch/lhcbproject/velo/testbeam/software/lpool0701/mfrank.ppt, Velo Software Meeting, Liverpool,(Jul. 7, 2001),pp. 1-32.

(Continued)

*Primary Examiner*—Eric B. Kiss

(57) ABSTRACT

An API schema language and transformation techniques allow an application programming interface to be defined in a markup language. This interface definition can then be transformed into a non-markup language source file. Examples of transformation techniques include techniques to transform the interface definition into a component object model (COM) header file, a documentation file that describes the contents of the non-markup language source file, and a proxy object code file.

20 Claims, 25 Drawing Sheets

OTHER PUBLICATIONS

Oracle, "Oracle Announces Availability of XML Developer's Kit", *Content Management, XML and Information Technology News*, (Nov. 9, 1999),p. 1.

Selkirk, A. , "SchemaCoder", *XML Data Binding Resources*, (Jul. 2001),pp. 1-32.

Selkirk, A. , "XML Schema Toolkit: An Explanation", Cover Pages: XML Articles and Papers,(Nov. 29, 2001),pp. 1-4.

Leach, Eric "Validating Multi-Vendor CORBA Conformance and Interoperability in Heterogeneous Environments", The Open Group.,(Dec. 2001),1-26.

* cited by examiner

API SCHEMA LANGUAGE AND TRANSFORMATION TECHNIQUES

RELATED APPLICATIONS

This application is a divisional of U.S. patent application Ser. No. 10/076,667, filed Feb. 14, 2002, entitled "API Schema Language and Transformation Techniques", which is hereby incorporated by reference herein.

TECHNICAL FIELD

This invention relates to computer programming and application programming interfaces, and particularly to an application programming interface schema language and transformation techniques.

BACKGROUND

As computer technology has advanced, computers have become increasingly powerful and the cost of this computing power has become increasingly affordable. As a result, computers are becoming increasingly commonplace in homes, businesses, and elsewhere throughout the world. Similarly, a wide variety of different computer platforms have evolved, including different computer hardware and different operating systems (typically software) running thereon.

The increasing number of computers and increasing computer power has also resulted in an increase in the types of software available for computers, as well as an increase in the functionality and performance of software. A wide variety of different software is available for running on different computers, and oftentimes a particular software package has multiple versions, each version for a particular type of computer or operating system.

While these advances have been beneficial to consumers, they have also made the design and testing of software increasingly difficult. The number of hours typically required to write a software program and test the program to ensure it is working properly have become very large, increasing the cost of developing the program. This increased cost must be absorbed by the developer or passed on to the purchaser of the program.

Thus, it would be beneficial to develop ways in which the time necessary to write and/or test software programs can be reduced. The API schema language and transformation techniques described herein help solve these and other problems.

SUMMARY

An API schema language and transformation techniques are described herein.

An API schema language allows an application programming interface to be defined in a markup language. This interface definition can then be transformed into a non-markup language source file. Examples of such non-markup language source files include a component object model (COM) header file, a documentation file that describes the contents of the non-markup language source file, and a proxy object code file.

BRIEF DESCRIPTION OF THE DRAWINGS

The same numbers are used throughout the document to reference like components and/or features.

DETAILED DESCRIPTION

Figure 1:
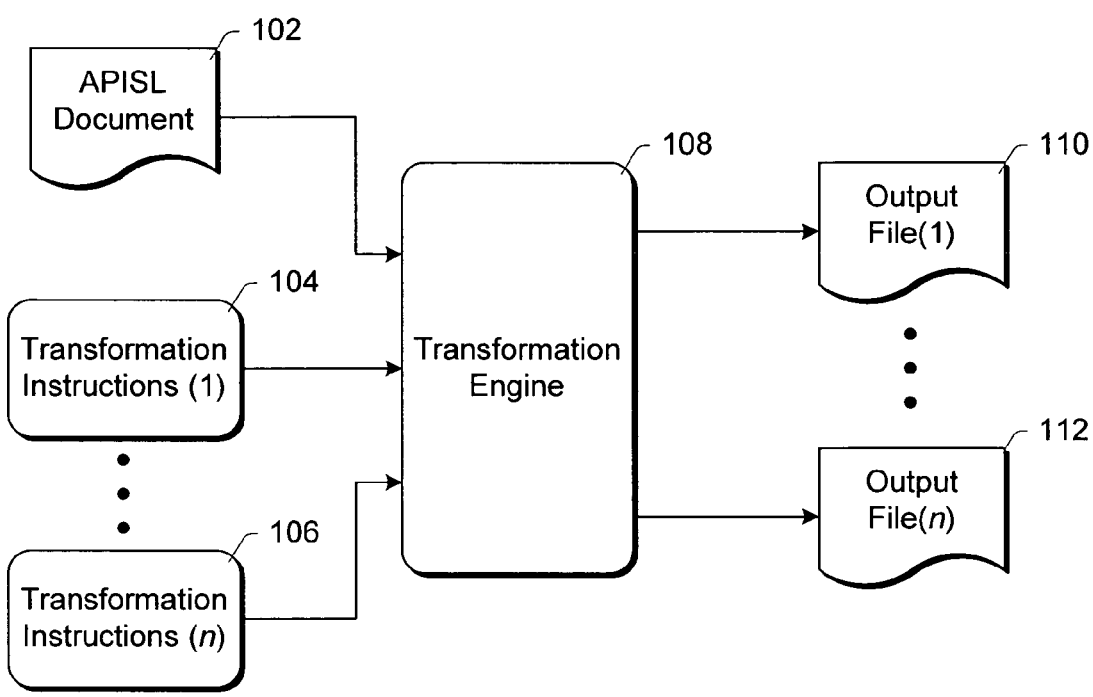
FIG. 1 is a block diagram illustrating an exemplary document and transformation of the document into multiple different output files or documents.

FIG. 1 is a block diagram illustrating an exemplary document and transformation of the document into multiple different output files or documents. A document 102 is illustrated that is written in an Application Programming Interface (API) description language, referred to as an API Schema Language (APISL). Although different public as well as proprietary formats can be used as a basis for the API Schema Language, in one implementation the API Schema Language is written in accordance with the eXtended Markup Language (XML) format. Different markup languages may also be used as a basis for the API Schema Language, such as the Standard Generalized Markup Language (SGML). The API Schema Language used for document 102 is discussed in additional detail below.

Multiple (n) transformation modules 104, 106 include transformation instructions that describe how APISL document 102 should be transformed in order to generate a particular output document. APISL document 102, along with at least one of the transformation instruction sets 104, 106, is input to a transformation engine 108. Transformation engine 108 applies the received instructions 104, 106 to APISL document 102 and generates an output file or document 110, 112, respectively.

Each of transformation modules 104, 106 can adhere to a variety of different formats and are dependent on the format used for document 102. In one implementation, each of transformation modules 104, 106 is implemented as an XSL (eXtensible Stylesheet Language) script document. The nature of transformation engine 108 is dependent in part on the format of transformation modules 104, 106. In one implementation, where transformation modules 104, 106 are implemented as XSL script documents, transformation engine 108 is a conventional XSL engine.

A wide variety of different output files or documents 110, 112 can be generated from the same APISL document 102 but using different transformation modules 104, 106. Different types of output files or documents 110, 112 can be generated, such as component object model (COM) API header files, enumeration value mappings or code (e.g., software instructions) to generate enumeration value mappings, code (e.g., software instructions) for proxy objects, documentation (e.g., corresponding to a COM API header file or test code created based on the APISL document), test code, etc.

In addition to different types of output files or documents 110, 112, the same type of file or document may also be generated in different programming languages by using different transformation modules 104, 106. For example, multiple different transformation modules may each describe how to generate a COM API header file, but in different software languages (e.g., one COM API header file in the C++ programming language, another in the C programming language, another in the VisualBasic programming language, etc.).

Figure 2:
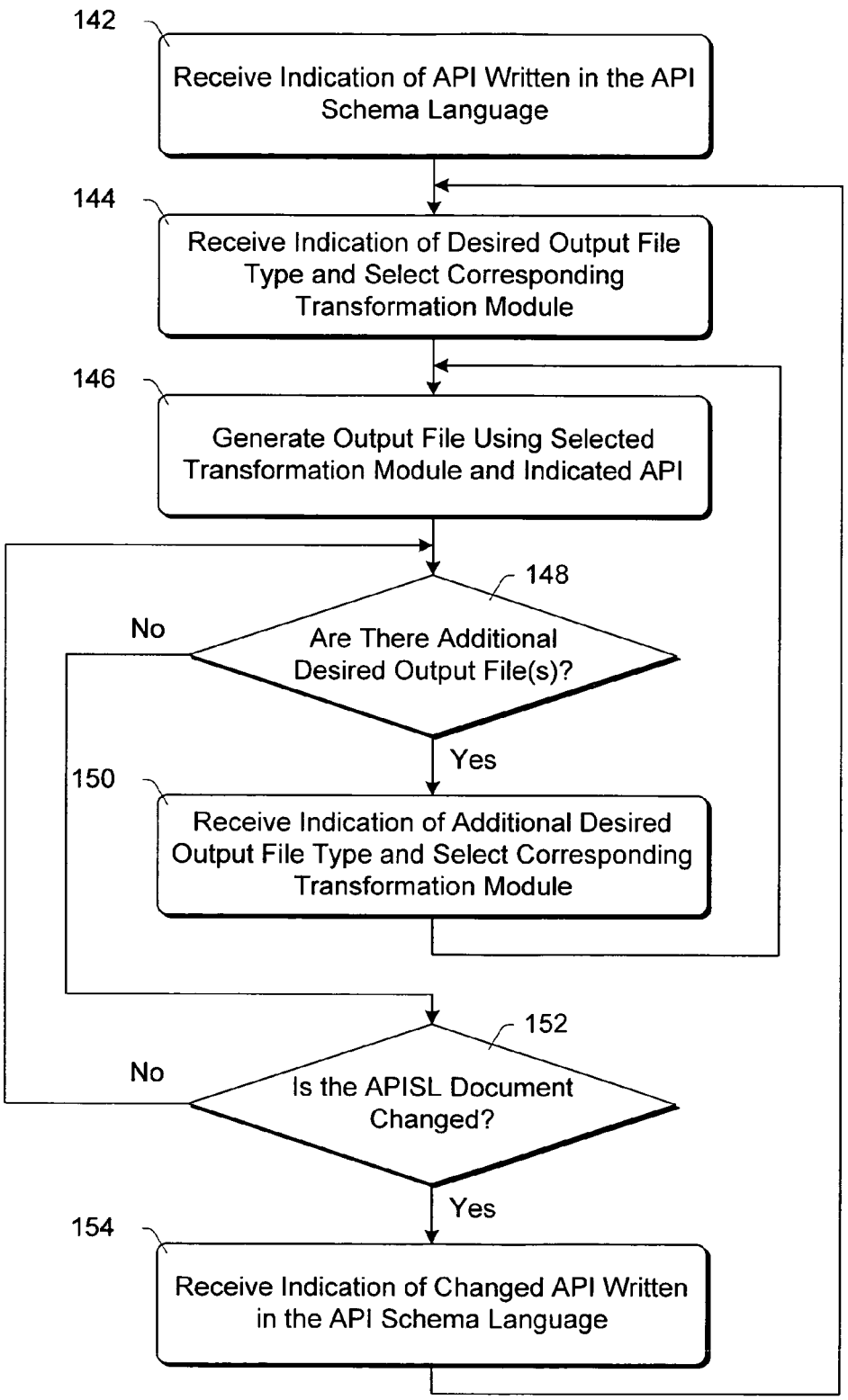
FIG. 2 is a flowchart illustrating an exemplary process for generating output files based on an APISL document.

FIG. 2 is a flowchart illustrating an exemplary process 140 for generating output files based on an APISL document. Process 140 is carried out by a transformation engine (e.g., engine 108 of FIG. 1), and may be performed in software.

Initially, an indication of an API written in the API Schema Language is received (act 142). This indication may be the actual APISL document itself, or alternatively a pointer or other reference to the file (e.g., a path and file name). The indication may be received directly from a user, or alternatively from another program. An indication of the desired output file type (and optionally programming language) is also received, and the corresponding transformation module selected (act 144). The indication of the desired output file may be received directly from a user, or alternatively from another program. The indication of the desired output file includes the type of file (e.g., COM API header file, proxy object file, etc.) if more than one type of file is possible, and the desired file programming language (e.g., C++ code, VisualBasic code, etc.) if more than one programming language for the file type is possible. Given these indications, the corresponding transformation module can be readily determined. Alternatively, rather than selecting a desired output file, the transformation module itself may be selected; thus, the indication of the desired output file is inherent in the transformation module selection.

The output file is then generated using the selected transformation module and indicated APISL document (act 146). A check is also made as to whether the generation of any additional output file(s) has been requested (act 148). If generation of an additional output file has been requested, then an indication is received of the additional desired output file type (and optionally programming language), and the corresponding transformation module selected (act 150), analogous to act 144 above. The process then continues at act 146 to generate the additional output file using the selected transformation module and the APISL document indicated in act 142.

Returning to act 148, if there are no additional desired output files, then a check is made as to whether the APISL document has been changed (act 152). This change may be manually indicated by a user or program (e.g., a command given to the transformation engine or on-screen button selected that indicates the APISL document has been changed). Alternatively, this change may be automatically detected by the transformation engine (e.g., the transformation engine may check file modification dates for the APISL document and the output files, and determine that the APISL document has been changed if its file modification date is later than the file modification date of one or more of the output files). If the APISL document has not been changed, then processing continues to wait until either an additional output file is desired (act 148) or the APISL document is changed (act 152).

However, if the APISL document has been changed, then it is possible (and typically the case) that the previously generated output file(s) is no longer accurate and should be re-generated to reflect the change(s) to the APISL document. Thus, an indication of the changed API written in the API Schema Language is received (act 154) and processing returns to act 144 to generate the desired output file(s).

Figure 3:
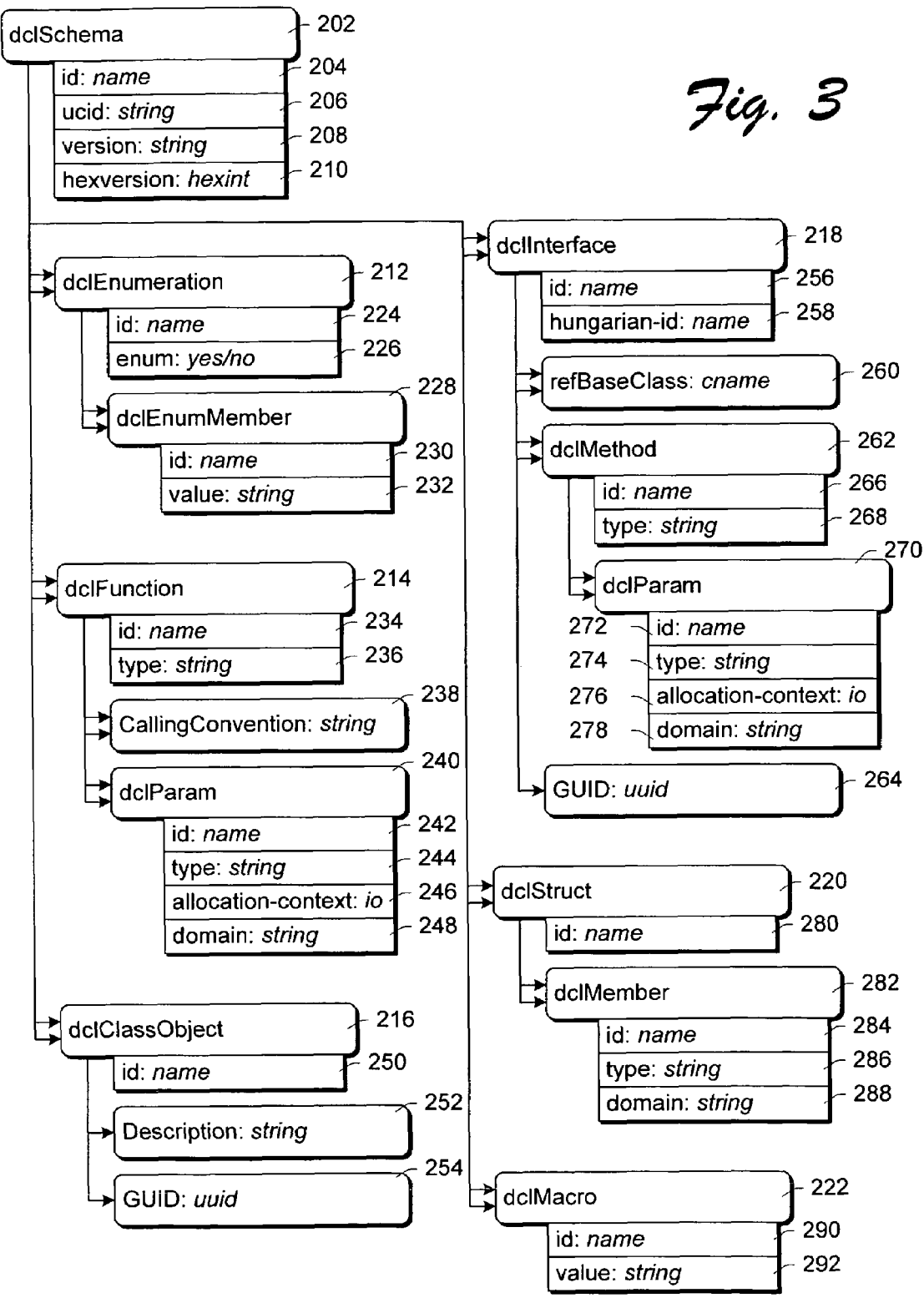
FIG. 3 is a block diagram illustrating an exemplary structure for an API Schema Language.

FIG. 3 is a block diagram illustrating an exemplary structure for an API Schema Language. Each API is defined using multiple constructs. As used herein, a construct refers to a set of one or more data items. These one or more data items include attributes (e.g., alphanumeric or numeric strings) as well as additional constructs. In the exemplary structure of FIG. 3, constructs are identified by name, many of which include "dcl" as an abbreviation for "declare" (e.g., "dclSchema" is an abbreviation for "declare schema"). The exemplary structure of FIG. 3 illustrates various fields for the API Schema language, including fields for constructs as well as attributes.

An API definition includes a dclSchema construct 202 with the following attributes: an id 204, a ucid 206, a version 208, and a hexversion 210. Id attribute 204 is an identifier (e.g., name) of the API, and ucid attribute 206 is a second identifier (e.g., another name, or all-caps version of the identifier in attribute 204) of the API. Version attribute 208 is a version of the API, and hexversion 210 is the version of the API in hexadecimal format. An example of a dclSchema construct 202 is illustrated in Table I below.

TABLE I

```
<dclSchema id="ZoneStat" ucid="ZONESTAT" version="1.0"
hexversion="0x0100">
  . . .
</dclSchema>
```

Numerous additional constructs (represented by the ellipsis in Table I) may also be included within the dclSchema construct 202, as discussed in more detail below.

Each API may also have zero or more dclEnumeration constructs 212, each defining an enumeration of the API; zero or more dclFunction constructs 214, each defining a function of the API; zero or more dclClassObject constructs 216, each defining a class object of the API; zero or more dclInterface constructs 218, each defining an interface of the API; zero or more dclStruct constructs 220, each defining a data structure of the API; and zero or more dclMacro constructs 222, each defining a manifest constant of the API. Double arrows leading into a construct of FIG. 3 are used to represent a one to many relationship (multiple constructs) while a single arrow leading into a construct is used to represent a one to one relationship (one construct). Thus, for example, a dclInterface construct 218 can include multiple dclMethod constructs, but includes only one GUID construct. In alternate embodiments, however, these one to many and one to one relationships may be changed (e.g., an alternate embodiment may allow multiple GUID constructs to be included in a dclInterface construct).

The dclEnumeration construct 212 includes an id attribute 224 which is the name of the enumeration being defined, and an enumeration flag attribute 226 that identifies which one of two different forms the enumeration is to follow. The dclEnumeration construct 212 also includes one or more dclEnumMember constructs 228. Each dclEnumMember construct 228 represents a member of the corresponding enumeration, and is defined by an id attribute 230 which is the name of the enumeration member and a value attribute 232 which is a string representing the value of the enumeration member. An example of a dclEnumeration construct 212 is illustrated in Table II below.

TABLE II

```
<dclEnumeration id="ZSREPORTSTATUS" enum="no">
  <dclEnumMember id="ZSREPORT_ACTIVE" value="0x01"/>
  <dclEnumMember id="ZSREPORT_INACTIVE" value="0x02"/>
  <dclEnumMember id="ZSREPORT_DISABLED" value="0x03"/>
</dclEnumeration>
```

The dclFunction construct 214 includes an id attribute 234 which is the name of the function being defined, and a type attribute 236 which is a string indicating a value type returned by the function. The dclFunction construct 214 includes one or more CallingConvention constructs 238 (also referred to as refCallingConvention constructs), and one or more dclParam constructs 240. Each CallingConvention construct 238 is a string indicating a calling convention to be followed in invoking the function being described. Each dclParam construct 240 represents a parameter for the function, and is defined by an id attribute 242 which is the name of the parameter, a type attribute 244 which is a string representing the data structure of the parameter, an allocation-context attribute 246 which is a flag indicating whether the parameter is an input parameter or an output parameter, and a domain attribute 248 which is a string that indicates the subtype of the parameter (e.g., as a further definition of the data structure of the parameter). An example of a dclFunction construct 214 is illustrated in Table III below.

TABLE III

```
<dclFunction id='ZoneStatCreate' type='HRESULT' >
  <refCallingConvention>WINAPI</refCallingConvention>
  <dclParam id="pZSDesc" type="ZONESTATDESC*"
  allocation-context="IN"/>
  <dclParam id="ppiZoneStat" type="IZoneStat**"
  allocation-context="OUT"/>
  <dclParam id="punkOuter" type="IUnknown*"
  allocation-context="IN"/>
</dclFunction>
```

The dclClassObject construct 216 includes an id attribute 250 which is the name of the class object being defined. The dclClassObject construct 216 also includes a description construct 252 and a GUID (Globally Unique IDentifier) construct 254. The description construct 252 is a string describing the class object, and the GUID construct 254 is a universally unique id (uuid) for the class object being defined. An example of a dclClassObject construct 216 is illustrated in Table IV below.

TABLE IV

```
<dclClassObject id="ZoneStat">
  <Description>ZoneStat Component</Description>
  <GUID>
    <data>4337C427</data>
    <data>A469</data>
    <data>4b4c</data>
    <data>9E</data>
    <data>51</data>
    <data>FB</data>
    <data>F1</data>
    <data>DB</data>
    <data>36</data>
    <data>BA</data>
    <data>71</data>
  </GUID>
</dclClassObject>
```

The dclInterface construct 218 includes an id attribute 256 which is the name of the interface being defined, and a hungarian-id attribute 258 which is the name of the interface being defined in Hungarian notation. The dclInterface construct 218 includes one or more refBaseClass constructs 260, one or more dclMethod constructs 262, and a GUID construct 264. The refBaseClass construct 260 is an identification of the base class for the interface being defined, and the GUID construct 264 is a universally unique id (uuid) for the interface being defined.

The dclMethod construct 262 includes an id attribute 266 which is the name of the method being defined by construct 262, and a type attribute 268 which is a string indicating a value type returned by the method. The dclMethod construct 262 includes one or more dclParam constructs 270 which define parameters for the method being defined by the dclMethod construct 262. Analogous to dclParam construct 240 discussed above, the dclParam construct 270 is defined by an id attribute 272 which is the name of the parameter, a type attribute 274 which is a string representing the data structure of the parameter, an allocation-context attribute 276 which is a flag indicating whether the parameter is an input parameter or an output parameter, and a domain attribute 278 which is a string that indicates the subtype of the parameter.

An example of a dclInterface construct 218 is illustrated in Table V below.

TABLE V

```
<dclInterface id="IZoneStat" hungarian-id="ZONESTAT">
  <refBaseClass>IUnknown</refBaseClass>
  <dclMethod id="Initialize" type="HRESULT">
    <dclParam id="pZSDesc" type="ZONESTATDESC*" allocation-context="IN"/>
  </dclMethod>
  <dclMethod id="GetDescription" type="HRESULT">
    <dclParam id="pZSDesc" type="ZONESTATDESC*" allocation-context="OUT"/>
  </dclMethod>
  <dclMethod id="CreateLog" type="HRESULT">
    <dclParam id="pLogDesc" type="ZSLOGDESC*" allocation-context="IN"/>
    <dclParam id="ppiLog" type="IZSLog**" allocation-context="OUT"/>
    <dclParam id="punkOuter" type="IUnknown*" allocation-context="IN"/>
  </dclMethod>
  <dclMethod id="GetReportStatus" type="HRESULT">
    <dclParam id="pdwStatus" type="DWORD*" domain="ZSREPORTSTATUS*" allocation-context="OUT"/>
  </dclMethod>
  <dclMethod id="SubmitReport" type="HRESULT">
    <dclParam id="pReportDesc" type="ZSREPORTDESC*" allocation-context="IN"/>
    <dclParam id="ppiReportSubmit" type="IZSReportStatus**" allocation-context="OUT"/>
    <dclParam id="punkOuter" type="IUnknown*" allocation-context="IN"/>
  </dclMethod>
  <dclMethod id="CreateQuery" type="HRESULT">
    <dclParam id="pQueryDesc" type="ZSQUERYDESC*" allocation-context="IN"/>
    <dclParam id="ppiLog" type="IZSQuery**" allocation-context="OUT"/>
    <dclParam id="punkOuter" type="IUnknown*" allocation-context="IN"/>
  </dclMethod>
  <GUID>
    <data>5fb72160</data>
    <data>ba4c</data>
    <data>40d3</data>
    <data>8f</data>
    <data>d5</data>
    <data>ef</data>
    <data>18</data>
    <data>ff</data>
    <data>cd</data>
    <data>92</data>
    <data>87</data>
  </GUID>
</dclInterface>
```

The dclStruct construct 220 includes an id attribute 280 which is the name of the data structure being defined, and also includes one or more dclMember constructs 282 which identify the variables being defined in the structure. Each dclMember construct 282 includes an id attribute 284 which is the name of the variable being defined, a type attribute 286 which is the type of the variable being defined, and a domain attribute 288 which indicates the subtype of the member. An example of a dclStruct construct 220 is illustrated in Table VI below.

TABLE VI

```
<dclStruct id="ZSLOGDESC">
  <dclMember id="dwSize" type="DWORD"/>
  <dclMember id="dwReserved" type="DWORD"/>
  <dclMember id="dwMaxLogfileCount" type="DWORD"/>
  <dclMember id="dwMaxLogfileLifetime" type="DWORD"/>
  <dclMember id="dwStartTime" type="time_t"/>
  <dclMember id="pszTitleReleaseDate" type="PCWSTR"/>
  <dclMember id="pszTitleVersion" type="PCWSTR"/>
  <dclMember id="pszExtendedInfo" type="PCWSTR"/>
</dclStruct>
```

The dclMacro construct 222 includes an id attribute 290 which is the name of the manifest constant being defined by construct 222, and a value attribute 292 which is a string identifying the value to be assigned to the constant. An example of a dclMacro construct 222 is illustrated in Table VII below.

TABLE VII

```
<dclMacro id="ZONESTAT_FACILITYCODE"
  value="FACILITY_ITF"/>
```

Using the structure described with reference to FIG. 3, an application programming interface can be defined in APISL. This APISL document can then be transformed into a C/C++ header file that includes the COM declarations as defined in the APISL. The following FIGS. 4-17 describe exemplary processes for transforming an APISL document into a C/C++ header file.

Figure 4A:
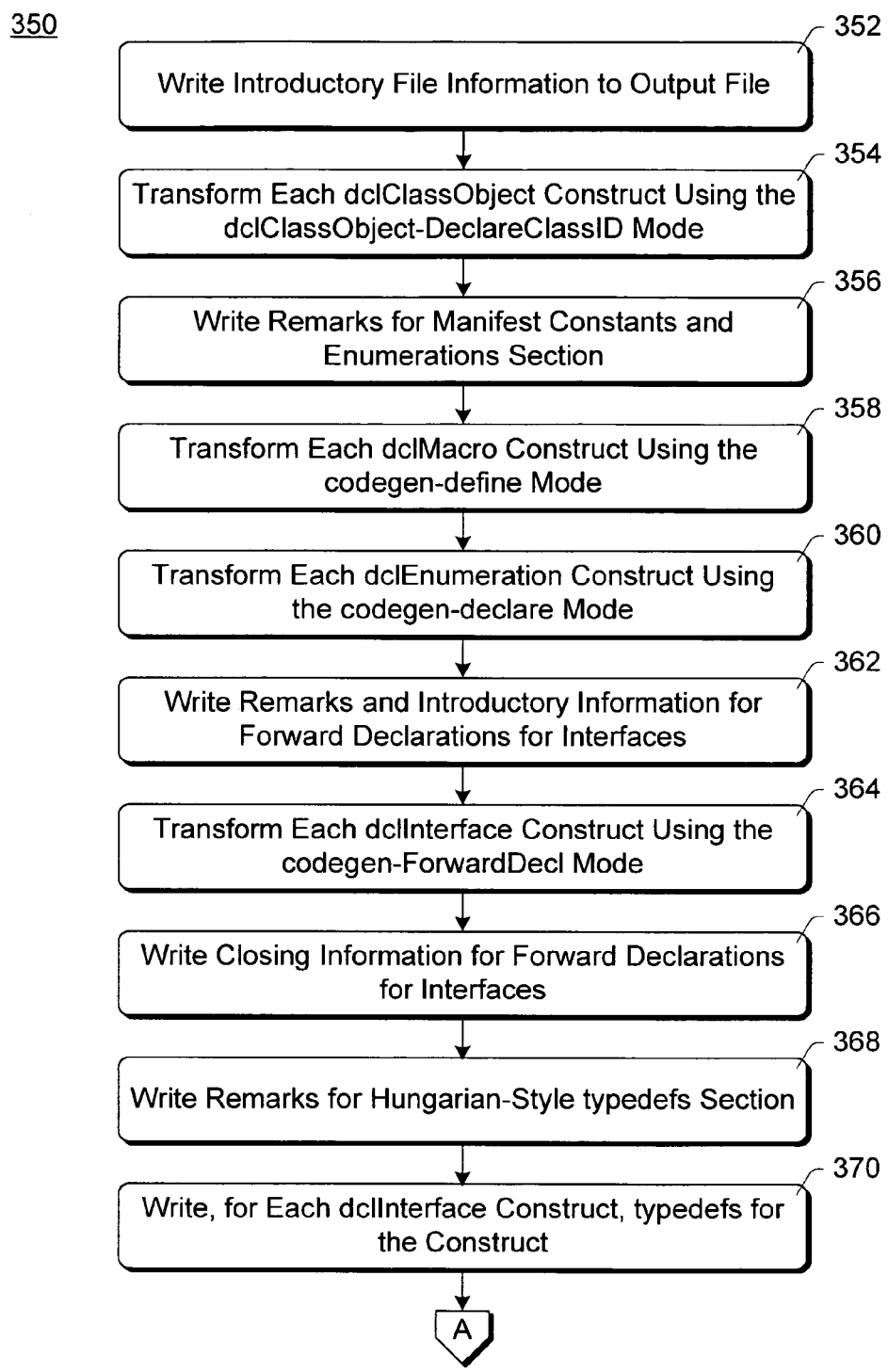
FIGS. 4a and 4b are a flowchart illustrating an exemplary process for transforming an APISL document into a C/C++ header file output file containing the defined COM declarations.
Figure 4B:
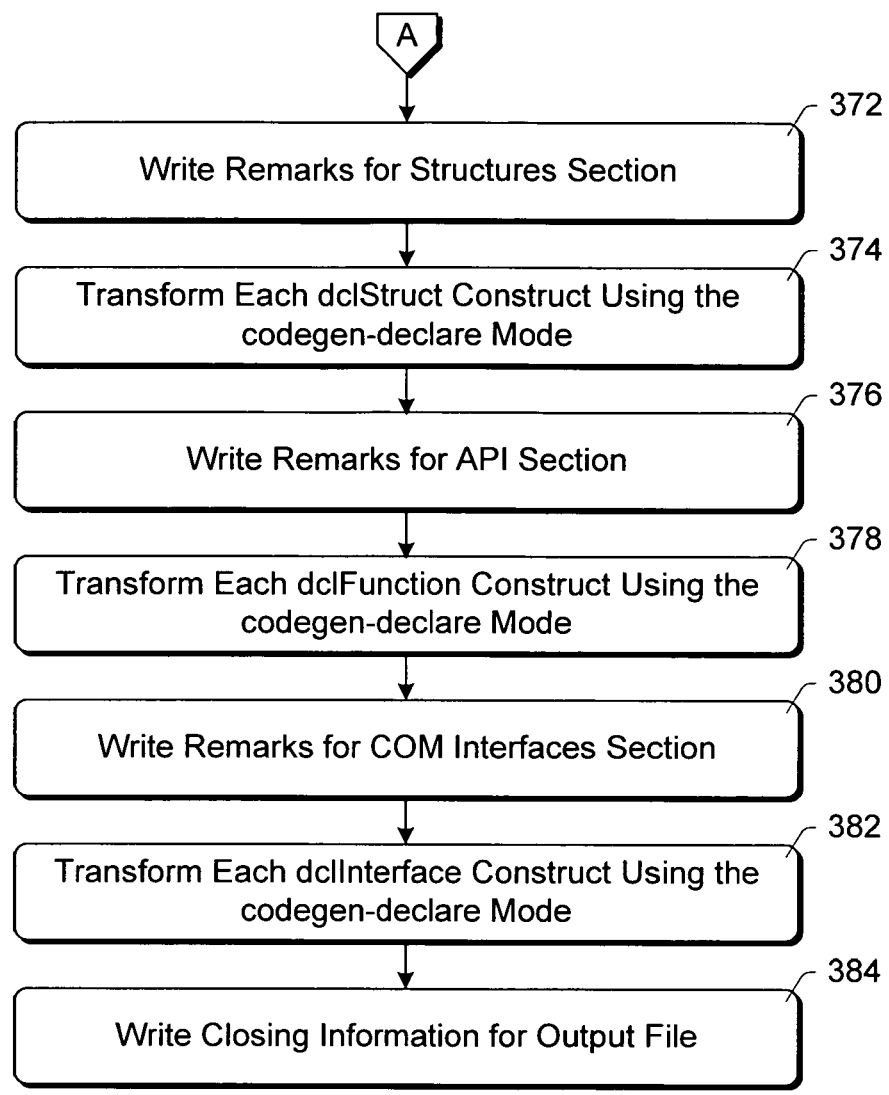

FIGS. 4*a* and 4*b* are a flowchart illustrating an exemplary process 350 for transforming an APISL document into a C/C++ API COM header file containing the defined COM declarations as defined in the APISL document. Process 350, as defined by a transformation module (e.g., transformation instructions 104, 106 of FIG. 1) is carried out by a transformation engine (e.g., engine 108 of FIG. 1) and may be performed in software. The order of the acts illustrated in process 350 is the order in which the identified data is written to and arranged in the output file. Process 350 is an example of act 146 of FIG. 2.

Initially, in FIG. 4*a*, introductory file information is written to the output file (act 352). This introductory file information includes introductory remarks, definitions, and include files. An example of this introductory file information is shown in Table VIII below.

TABLE VIII

```
"/**************************************************************" eol
eol
"Copyright (C) " @copyright_date space @copyright_owner ". All Rights Reserved." eol
eol
"File: " @id ".h" eol
"Content: " @id " include file" eol
eol
" **************************************************************/"
eol
eol
"#if _MSC_VER > 1000" eol
"#pragma once" eol
"#endif" eol
eol
"#ifndef___" @ucid "_INCLUDED___"
"#define COM_NO_WINDOWS_H" eol
"#include <objbase.h>" eol
eol
"#ifndef" @ucid "_VERSION"
"#define " @ucid "_VERSION " @hexversion "/* Version " @version "*/"
"#endif"
"#ifdef___cplusplus" eol
"extern \"C\" {" eol
"#endif// ___cplusplus " eol
```

Each dclClassObject construct is then transformed using the dclClassObject-DeclareClassID mode (act 354). Different constructs can be transformed in different manners during the same transformation process. These different ways of transforming constructs are differentiated using different modes. The transformation process of act 354 is discussed in more detail below with reference to FIG. 5.

Remarks for the manifest constants and enumerations section are then written to the output file (act 356). An example of this remarks data is shown in Table IX below.

TABLE IX

```
eol
"// =====================================" eol
"// Manifest Constants and Enumerations" eol
"// =====================================" eol
eol
```

Each dclMacro construct is then transformed using the codegen-define mode (act 358). The transformation process of act 358 is discussed in more detail below with reference to FIG. 6. Each dclEnumeration construct is then transformed using the codegen-declare mode (act 360), and an eol (end of line, also referred to as a carriage return) is written to the output file after each transformed enumeration. The transformation process of act 360 is discussed in more detail below with reference to FIG. 7.

Remarks and introductory information for the forward declarations for interfaces section are then written to the output file (act 362). An example of these remarks and introductory information is shown in Table X below.

TABLE X

```
eol
"// =====================================" eol
"// Forward declarations for interfaces." eol
"// =====================================" eol
eol
"#ifdef___cplusplus" eol eol
```

Each dclInterface construct is then transformed using the codegen-ForwardDecl mode (act 364), and an eol is written to the output file after each transformed enumeration. The transformation process of act 364 is discussed in more detail below with reference to FIG. 8. Closing information for the forward declarations for interfaces section is then written to the output file (act 366). An example of this closing information is shown in Table XI below.

TABLE XI

```
"#endif// ___cplusplus" eol eol
```

Remarks for the Hungarian notation type definitions (typedefs) are then written to the output file (act 368). An example of these remarks is shown in Table XII below.

TABLE XII

```
eol
"// ====================================="
"// MSHungarian-Style typedefs (for nomenclature compatibility with DirectX)"
"// ====================================="
eol
```

For each dclInterface construct, type definitions using Hungarian notation are written to the output file (act 370). An example of the type definitions written for each dclInterface construct, where "item" is set equal to the dclInterface construct, is shown in Table XIII below.

TABLE XIII eol
"// interface " $item→@id "ms-hungarian typedefs" eol
"typedef struct " @id "* LP" @hungarian-id eol
"typedef LP" @hungarian-id "* LPLP" @hungarian-id eol
"typedef struct " @id "* P" @hungarian-id eol
"typedef P" @hungarian-id "* PP" @hungarian-id eol Turning to FIG. 4b, remarks for the structures section are then written to the output file (act 372). An example of these remarks is shown in Table XIV below.

TABLE XIV eol
"// =======" eol
"// Structures" eol
"// =======" eol
eol

Each dclStruct construct is then transformed using the codegen-declare mode (act 374), and an eol is written to the output file after each transformed structure. The transformation process of act 374 is discussed in more detail below with reference to FIG. 9.

Remarks for the API section are then written to the output file (act 376). An example of these remarks is shown in Table XV below.

TABLE XV eol
"// ===" eol
"// API" eol
"// ===" eol
eol

Each dclFunction construct is then transformed using the codegen-declare mode (act 378), and an eol is written to the output file after each transformed function. The transformation process of act 378 is discussed in more detail below with reference to FIG. 10.

Remarks for the COM interfaces section are then written to the output file (act 380). An example of these remarks is shown in Table XVI below.

TABLE XVI eol
"// ==========" eol
"// COM Interfaces" eol
"// ==========" eol
eol Each dclInterface construct is then transformed using the codegen-declare mode (act 382), and an eol is written to the output file after each transformed interface. The transformation process of act 382 is discussed in more detail below with reference to FIGS. 11a-11c.

Closing information for the output file is then written to the output file (act 384). An example of this closing information is shown in Table XVII below.

Figure 5:
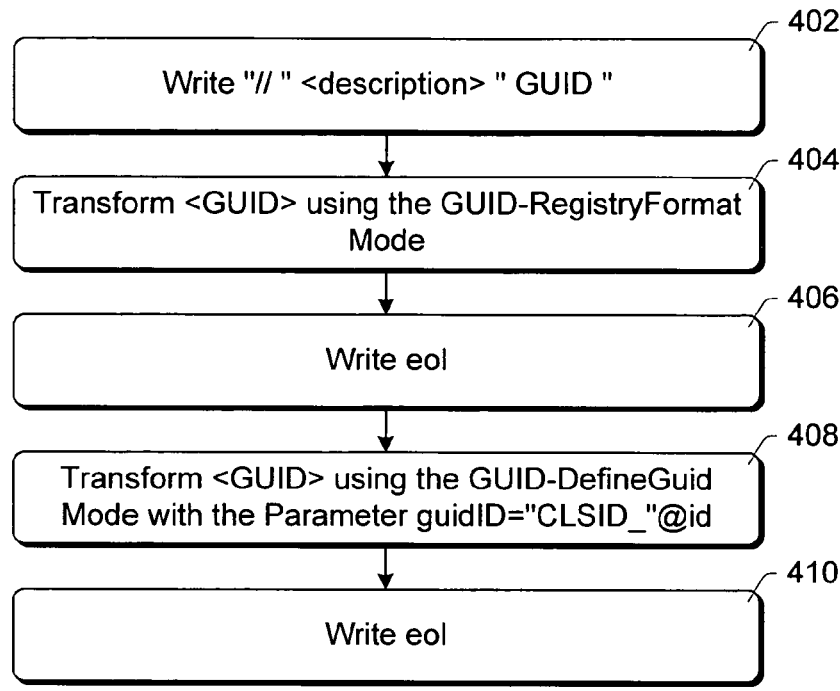
FIG. 5 is a flowchart illustrating an exemplary process for transforming a dclClassObject construct into a C/C++ COM class object ID declaration.

TABLE XVII eol eol eol
"#ifdef___cplusplus" eol
"};" eol
"#endif/*___cplusplus */" eol FIG. 5 is a flowchart illustrating an exemplary process 354 for transforming a dclClassObject construct into a C/C++ COM class object ID declaration. The process 354 is for transforming a dclClassObject construct using the dclClassObject-DeclareClassID mode.

Initially, in act 402, the following is written to the output file: "// " <description> " GUID ". In act 402, <description> refers to the value of the description construct of the dclClassObject construct (construct 252 of FIG. 3), and <GUID> refers to the value of the GUID construct of the dclClassObject construct (construct 254 of FIG. 3) being transformed using the GUID-RegistryFormat mode (act 404).

Figure 12:
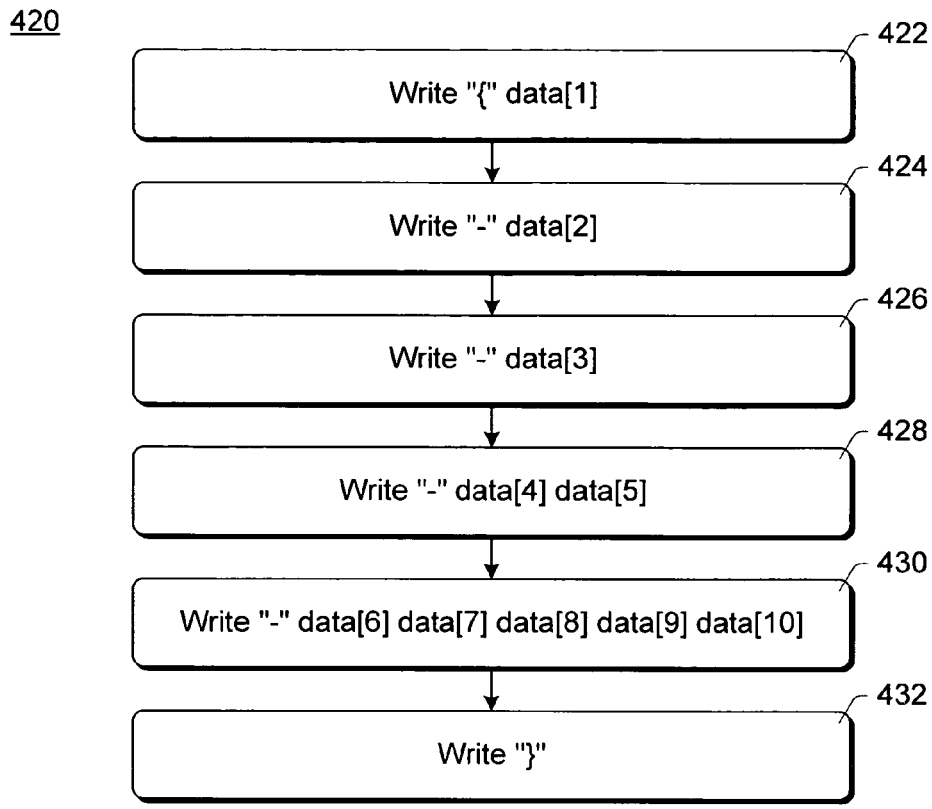
FIG. 12 is a flowchart illustrating an exemplary process for transforming a GUID using the GUID-RegistryFormat mode.

FIG. 12 is a flowchart illustrating an exemplary process 420 for transforming a GUID (e.g., of the dclClassObject construct) using the GUID-RegistryFormat mode. The GUID is defined using multiple pieces of data, which can be referred to as data[x] where x represents the xth piece of data. An example of a defined GUID attribute is shown in Table XVIII below.

TABLE XVIII

<GUID>
    <data>e4d9f7ba</data>
    <data>eaaa</data>
    <data>4e96</data>
    <data>ad</data>
    <data>8c</data>
    <data>e1</data>
    <data>1c</data>
    <data>8e</data>
    <data>ee</data>
    <data>86</data>
    <data>9a</data>
</GUID>

Initially in process 420, an opening bracket is written followed by data[1] (act 422). A hyphen is then written followed by data[2] (act 424), and another hyphen is written followed by data[3] (act 426). Another hyypen is then written followed by data[4] and data[5] (act 428). Another hyphen is then written followed by data[6], data[7], data[8], data[9], and data[10] (act 430). Finally, a closing bracket is written (act 432). Table XIX below shows the example GUID of Table XVIII transformed using process 420.

TABLE XIX

{e4d9f7ba-eaaa-4e96-ad8c-e11c8eee869a}

Returning to FIG. 5, after transforming the value of <GUID> using the GUID-RegistryFormat mode, an eol is written to the output file (act 406). The value of <GUID> is then transformed using the GUID-DefineGuid mode with a parameter guidID being set equal to "CLSID_"@id (act 408), where @id refers to the value of the id attribute of the dclClassObject (id attribute 250 of FIG. 3).

Figure 13:
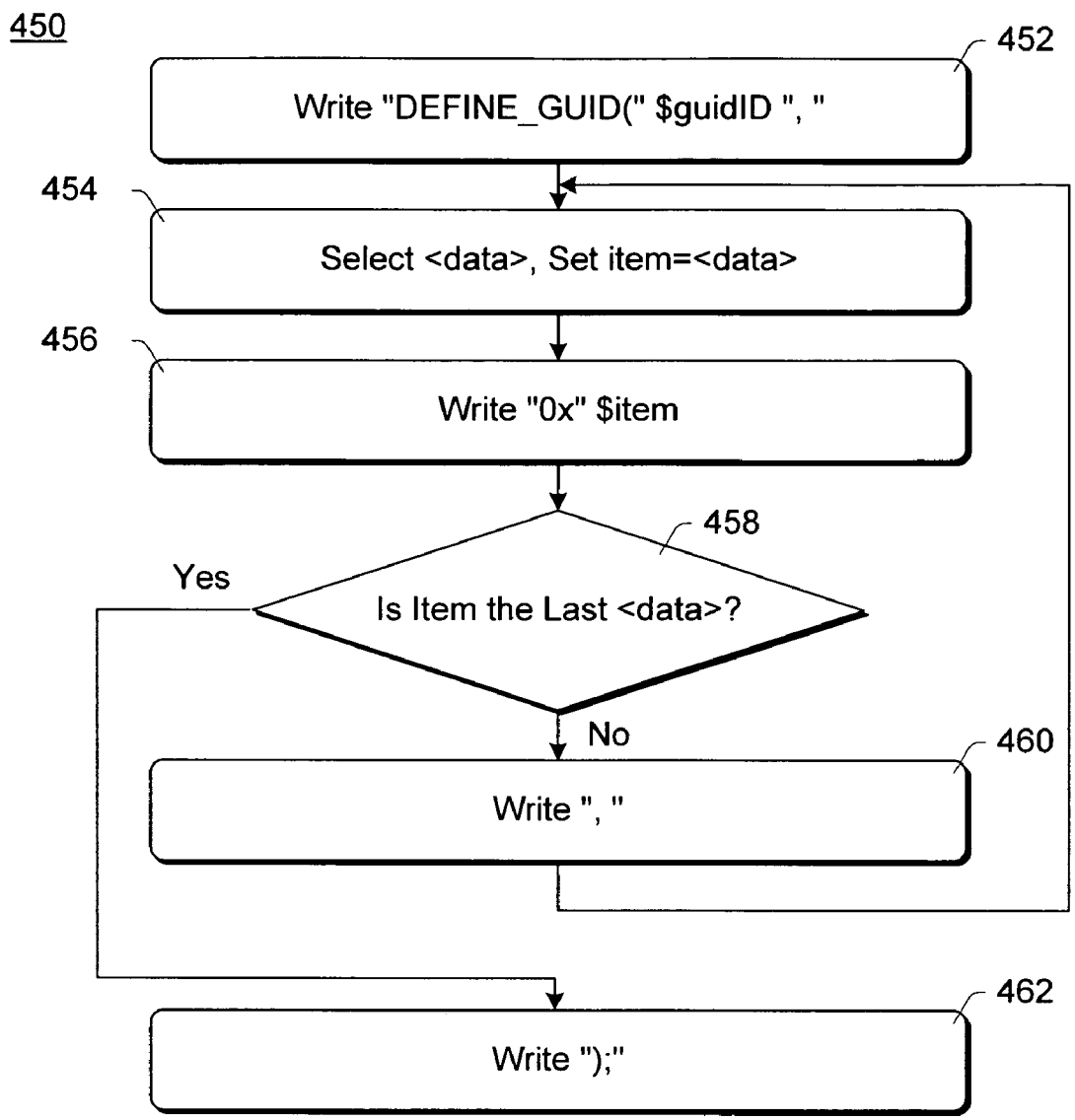
FIG. 13 is a flowchart illustrating an exemplary process for transforming a GUID attribute of a construct using the GUID-DefineGuid mode.

FIG. 13 is a flowchart illustrating an exemplary process 450 for transforming a GUID attribute of a construct (e.g., the dclClassObject construct) using the GUID-DefineGuid mode. As discussed above with reference to FIG. 12, the GUID is defined using multiple pieces of data.

Initially, in act 452, the following is written to the output file: "DEFINE_GUID(" $guidID ", ". In act 452, $guidID is the received parameter (from act 408 of FIG. 5). The first piece of data from the GUID is then selected and a temporary variable "item" is set equal to the selected piece of data (act 454), and in act 456 the following is then written to the output file: "0x" $item. A check is then made as to whether the item is the last piece of data in the GUID (act 458). If the item is not the last piece of data in the GUID, then a comma is written to the output file (act 460) and the process returns to act 454 where the next piece of data in the GUID is selected and set equal to the temporary variable "item". However, if the item is the last piece of data in the GUID, then a closing parenthesis and semicolon are written to the output file (act 462).

Table XX below shows the example GUID of Table XVII transformed using process 450 with the parameter guidID being set to "CLSID_ZoneStat.

TABLE XX

DEFINE_GUID(CLSID_ZoneStat, 0xe4d9f7ba, 0xeaaa, 0x4e96, 0xad, 0x8c, 0xe1, 0x1c, 0x8e, 0xee, 0x86, 0x9a);

Returning to FIG. 5, after transforming the value of <GUID> using the GUID-DefineGuid mode, an eol is written to the output file (act 410), and the transformation process 354 ends. Table XXI below shows the example dclClassObject construct of Table IV transformed using the process of FIG. 5.

TABLE XXI

Figure 6:
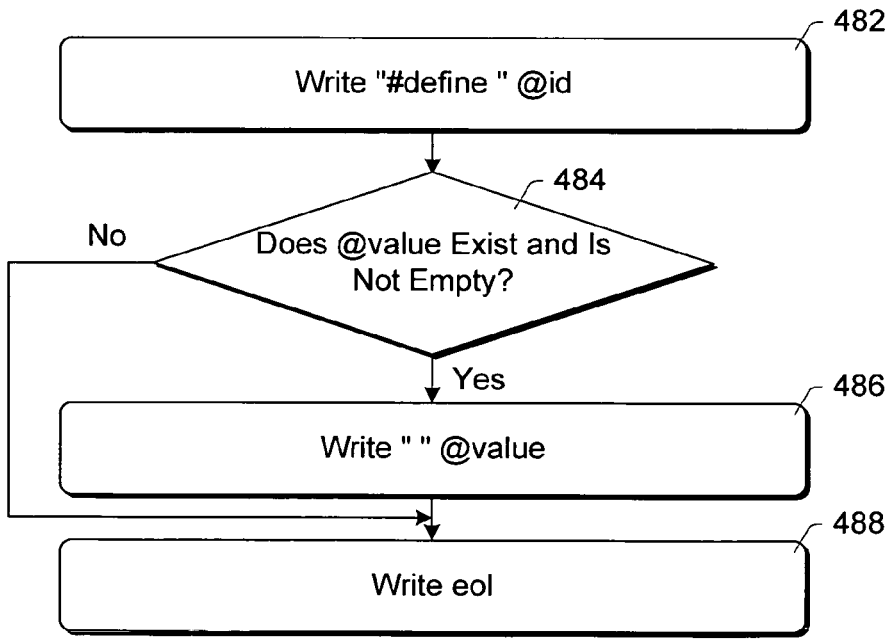
FIG. 6 is a flowchart illustrating an exemplary process for transforming a dclMacro construct into a C/C++ COM manifest constant.

// ZoneStat Component GUID {4337C427-A469-4b4c-9E51-FBF1DB}
DEFINE_GUID(CLSID_ZoneStat, 0x4337C427, 0xA469, 0x4b4c, 0x9E, 0x51, 0xFB, 0xF1, 0xDB, 0x36, 0xBA, 0x71);

FIG. 6 is a flowchart illustrating an exemplary process 358 for transforming a dclMacro construct into a C/C++ COM manifest constant. The process 358 is for transforming a dclMacro construct using the codegen-define mode.

Initially, in act 482, the following is written to the output file: "#define " @id. In act 282, @id refers to the value of the id attribute of the dclMacro construct (attribute 290 of FIG. 3). A check is then made as to whether the value attribute of the dclMacro construct (attribute 292 of FIG. 3) exists and is not empty (act 484). If the value attribute exists and is not empty, then a space followed by the value of the value attribute is written to the output file (act 486), followed by writing an eol to the output file (act 488). Returning to act 484, if the value attribute does not exist or is empty, then the eol is written to the output file (act 488) without writing a value of the value attribute to the output file.

Table XXII below shows the example dclMacro construct of Table VII transformed using the process of FIG. 6.

TABLE XXII define ZONESTAT_FACILITYCODE FACILITY_ITF

Figure 7:
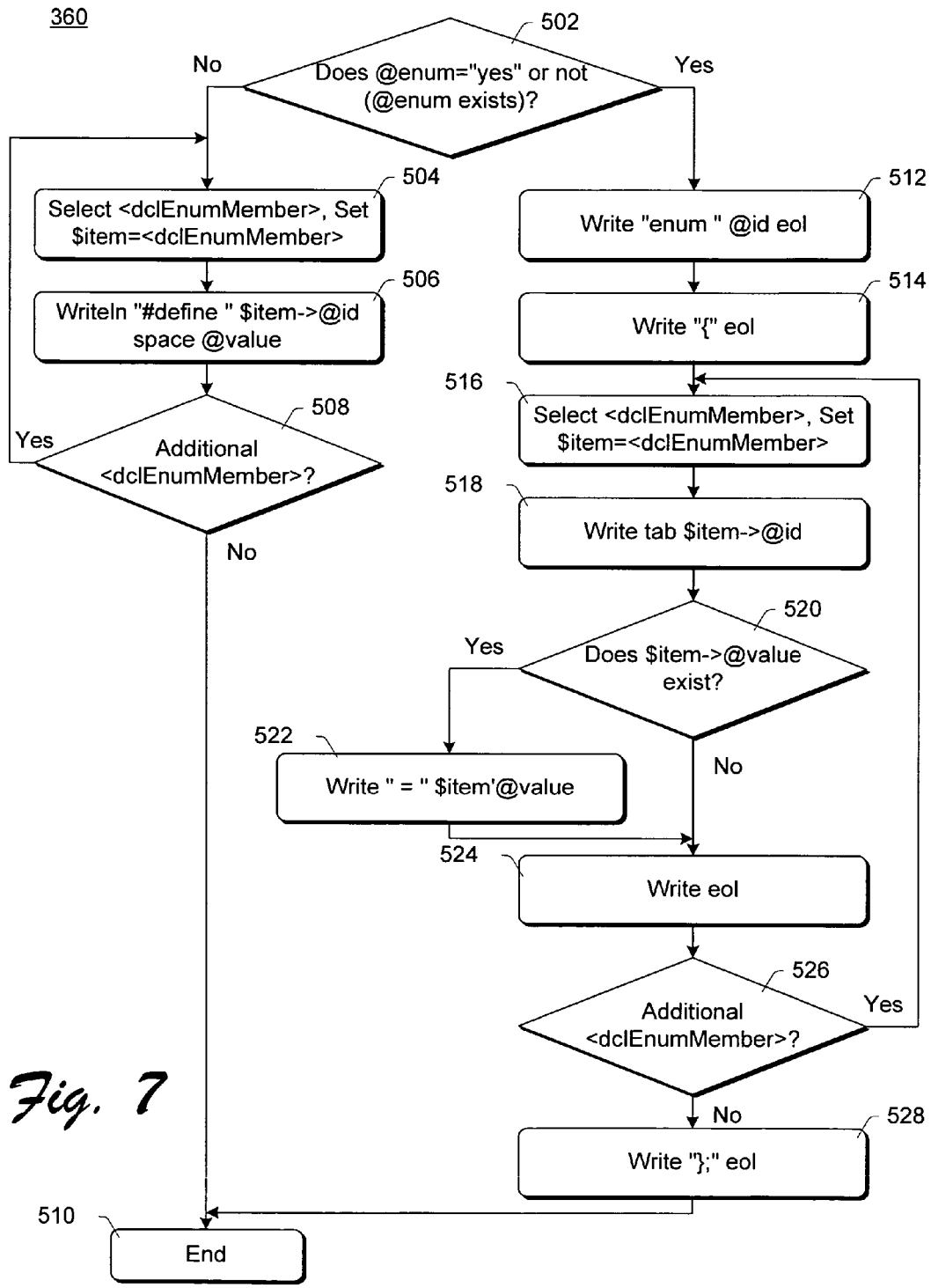
FIG. 7 is a flowchart illustrating an exemplary process for transforming a dclEnumeration construct into a series of definitions of C/C++ manifest constants or a C/C++ enumeration declaration.

FIG. 7 is a flowchart illustrating an exemplary process 360 for transforming a dclEnumeration construct into a series of definitions of C/C++ manifest constants or a C/C++ enumeration declaration. The process 360 is for transforming a dclEnumeration construct using the codegen-declare mode.

Initially, in act 502, a check is made as to whether an enumeration attribute 14 of the dclEnumeration construct (attribute 226 of FIG. 3) is set to "yes", "no", or does not exist. If the enumeration attribute is either set to "yes" or does not exist, then processing proceeds to transform the dclEnumeration construct into a C/C++ enumeration declaration, whereas if the enumeration attribute is set to "no" then processing proceeds to transform the dclEnumeration construct into a series of C/C++ manifest constants.

If the enumeration attribute is set to "no", then the first dclEnumMember construct (construct 228 of FIG. 3) of the dclEnumeration construct is selected and set equal to a temporary variable $item (act 504). Then, in act 506, the following is written to the output file: "#define " $item→@id space @value. In act 506, $item→@id refers to the value of the id attribute of the selected dclEnumMember construct (attribute 230 of FIG. 3), and @value refers to the value of the value attribute of the selected dclEnumMember construct (attribute 232 of FIG. 3). A check is then made as to whether there are any additional dclEnumMember constructs in the dclEnumeration construct that have not been selected in act 504 (act 508). If there are additional dclEnumMember constructs, then processing returns to act 504 to select the next dclEnumMember construct; otherwise, process 360 ends (act 510).

Returning to act 502, if the enumeration attribute is either set to "yes" or does not exist, then in act 512 the following is written to the output file: write "enum " @id eol. In act 512, @id refers to the value of the id attribute of the dclEnumeration construct (attribute 224 of FIG. 3). An opening bracket and eol are then written to the output file (act 514). The first dclEnumMember construct (construct 228 of FIG. 3) of the dclEnumeration construct is then selected and set equal to a temporary variable $item (act 516). Then, in act 518, the following is written to the output file: tab $item→@id. In act 518, $item→@id refers to the value of the id attribute of the selected dclEnumMember (attribute 230 of FIG. 3). In act 518, and elsewhere herein, tab refers to a conventional tab indentation (e.g., five spaces). A check is then made as to whether the selected dclEnumMember construct has a value (e.g., whether value attribute 232 of FIG. 3 for the selected dclEnumMember construct is not empty) (act 520). If the selected dclEnumMember construct has a value, then the following is written to the output file in act 522: "=" $item→@value. In act 522, $item→@value refers to the value of the value attribute of the selected dclEnumMember construct (attribute 232 of FIG. 3). An eol is then written to the output file (act 524). Returning to act 520, if the selected dclEnumMember construct does not have a value, then an eol is written to the output file (act 524).

A check is then made as to whether there are any additional dclEnumMember constructs in the dclEnumeration construct that have not been selected in act 516 (act 526). If there are additional dclEnumMember constructs, then processing returns to act 516 to select the next dclEnumMember construct. If there are not additional dclEnumMember constructs, then a closing bracket, semicolon, and eol are written to the output file (act 528) and process 360 ends (act 510).

Table XXIII below shows the example dclEnumeration construct of Table II transformed into a series of C/C++ manifest constants using the process of FIG. 7.

TABLE XXIII define ZSREPORT_ACTIVE 0x01
define ZSREPORT_INACTIVE 0x02
define ZSREPORT_DISABLED 0x03

Table XXIV below shows a dclEnumeration construct transformed into a C/C++ enumeration declaration using the process of FIG. 7. The dclEnumeration construct transformed to generate the enumeration declaration in Table XXIV is similar to the example construct of Table II, except that the enum attribute of the dclEnumeration construct is set to "yes" rather than "no" as shown in Table II.

TABLE XXIV

```
enum ZSREPORTSTATUS
{
    ZSREPORT_ACTIVE = 0x01,
    ZSREPORT_INACTIVE = 0x02,
    ZSREPORT_DISABLED = 0x03
};
```

Figure 8:
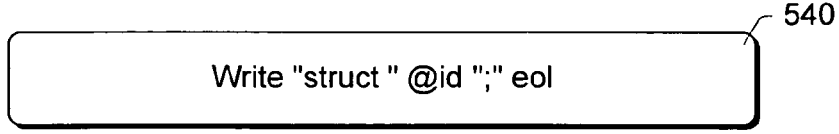
FIG. 8 is a flowchart illustrating an exemplary process for transforming a dclInterface construct into a C/C++ forward class declaration for the interface.

FIG. 8 is a flowchart illustrating an exemplary process 364 for transforming a dclInterface construct into a C/C++ forward class declaration for the interface. The process 364 is for transforming a dclInterface construct using the codegen-ForwardDecl mode.

In process 364, the following (act 540) is written to the output file: "struct " @id ";" eol. In act 540, @id refers to the value of the id attribute of the dclInterface construct (attribute 256 of FIG. 3). Table XXV below shows the example dclInterface construct of Table V transformed using the process of FIG. 8.

TABLE XXV

```
struct IZSLog;
```

Figure 9:
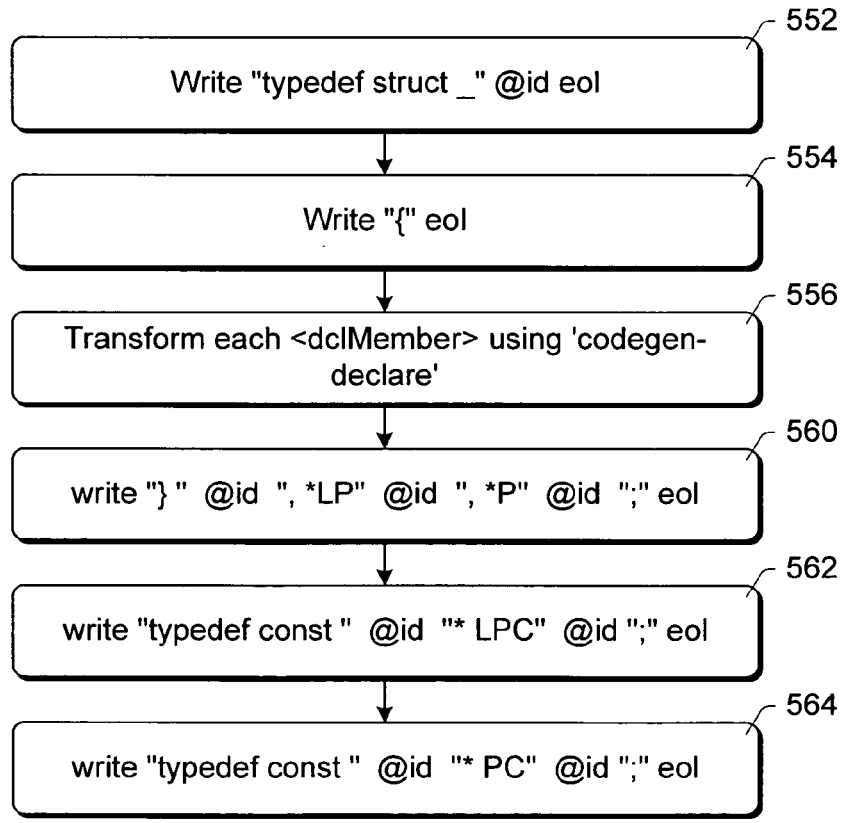
FIG. 9 is a flowchart illustrating an exemplary process for transforming a dclStruct construct into a C/C++ struct declaration.

FIG. 9 is a flowchart illustrating an exemplary process 374 for transforming a dclStruct construct into a C/C++ struct declaration. The process 374 is for transforming a dclStruct construct using the codegen-declare mode.

Initially, in act 552, the following is written to the output file: "typedef struct_" @id eol. In act 552, @id refers to the value of the id attribute of the dclStruct construct (attribute 280 of FIG. 3). An opening bracket and eol are then written to the output file (act 554), and each dclMember construct (construct 282 of FIG. 3) of the dclStruct construct is transformed using the codegen-declare mode (act 556).

Figure 14:
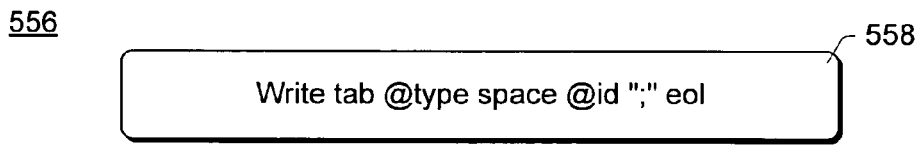
FIG. 14 is a flowchart illustrating an exemplary process for transforming a dclMember construct into a C++ member declaration inside of a C++ struct declaration.

FIG. 14 is a flowchart illustrating an exemplary process 556 for transforming a dclMember construct into a C++ member declaration inside of a C++ struct declaration. The process 556 is for transforming a dclMember construct using the codegen-declare mode.

In process 556, the following (act 558) is written to the output file: tab @type space @id ";" eol. In act 558, @type refers to the value of the type attribute of the dclMember construct (attribute 286 of FIG. 3), and @id refers to the value of the id attribute of the dclMember construct (attribute 284 of FIG. 3). Table XXVI below shows an example dclMember construct from Table VI above, and Table XXVII below shows the example dclMember construct of Table XXVI transformed using the process of FIG. 14.

TABLE XXVI

```
<dclMember id="dwSize" type="DWORD"/>;
```

TABLE XXVII

```
DWORD dwSize;
```

Returning to FIG. 9, after transforming all of the dclMember constructs, the following is written to the output file in act 560: "} " @id ", *LP" @id ", *P" @id ";" eol. In act 562, the following is written to the output file: "typedef const " @id "* LPC" @id ";" eol. In act 564, the following is written to the output file: "typedef const " @id "* PC" @id ";" eol. In acts 560, 562, and 564, @id refers to the value of the id attribute of the dclStruct construct (attribute 280 of FIG. 3).

Table XXVIII below shows the example dclStruct construct of Table VI transformed using the process of FIG. 9.

TABLE XXVIII

```
typedef struct_ZSLOGDESC
{
    DWORD dwSize;
    DWORD dwReserved;
    DWORD dwMaxLogfileCount;
    DWORD dwMaxLogfileLifetime;
    time_t dwStartTime;
    PCWSTR pszTitleReleaseDate;
    PCWSTR pszTitleVersion;
    PCWSTR pszExtendedInfo;
} ZSLOGDESC, *LPZSLOGDESC, *PZSLOGDESC;
typedef const ZSLOGDESC* LPCZSLOGDESC;
typedef const ZSLOGDESC* PCZSLOGDESC;
```

Figure 10:
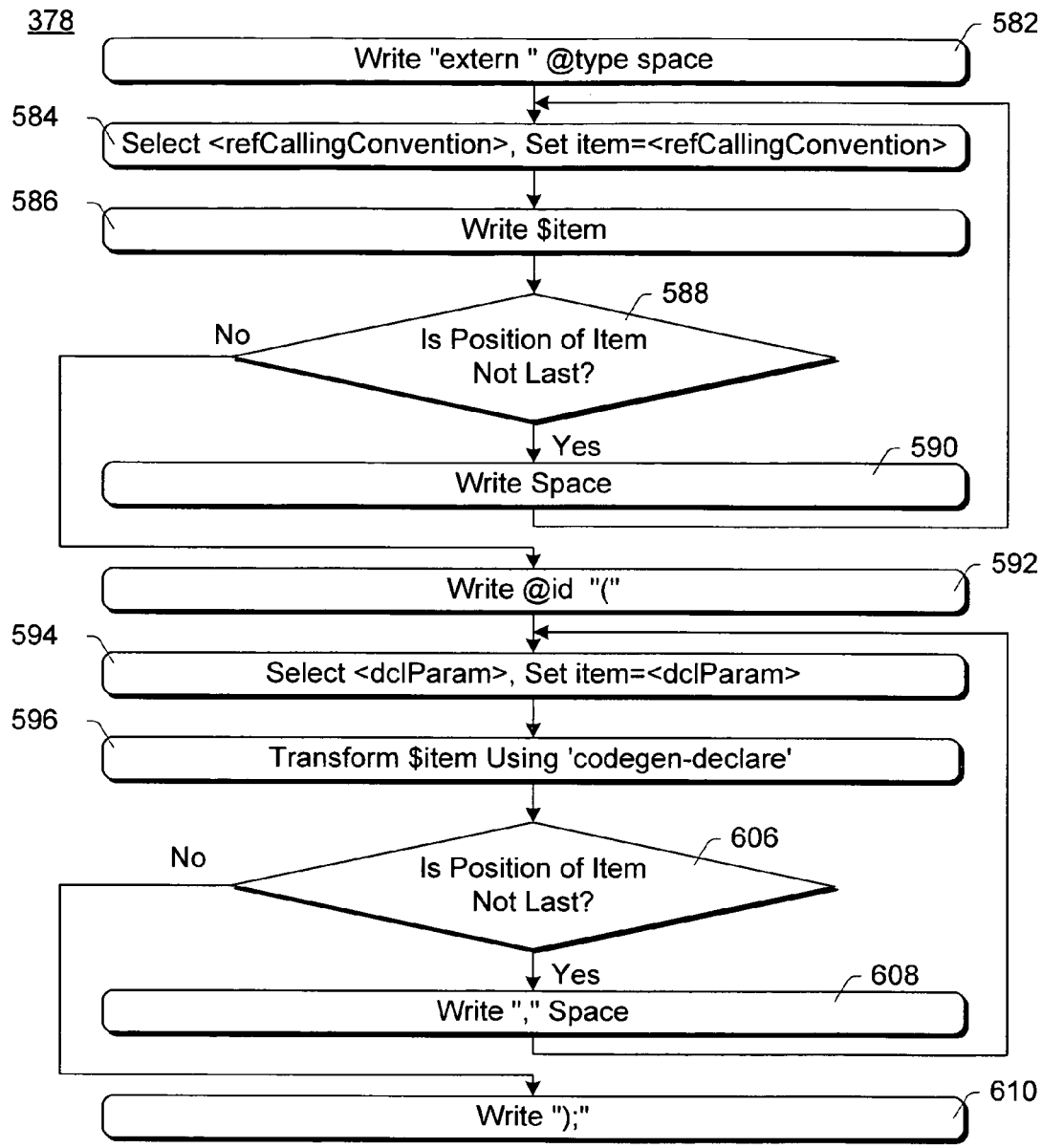
FIG. 10 is a flowchart illustrating an exemplary process for transforming a dclFunction construct into a C++ function declaration.

FIG. 10 is a flowchart illustrating an exemplary process 378 for transforming a dclFunction construct into a C/C++ function declaration. The process 378 is for transforming a dclFunction construct using the codegen-declare mode.

Initially, in act 582, the following is written to the output file: "extern " @type space. In act 582, @type refers to the value of the type attribute of the dclFunction (attribute 236 of FIG. 3). The first refCallingConvention construct (construct 238 of FIG. 3) of the dclFunction construct is selected and a temporary variable "item" is set equal to the selected refCallingConvention construct (act 584). The value of the selected refCallingConvention is written to the output file (act 586), and a check made as to whether the selected refCallingConvention construct is the last refCallingConvention construct in the dclFunction construct (act 588). If the selected refCallingConvention construct is not the last refCallingConvention construct in the dclFunction construct, then a space is written to the output file (act 590), and processing returns to act 584 to select the next refCallingConvention construct.

However, if the selected refCallingConvention construct is the last refCallingConvention construct in the dclFunction construct, then the following is written to the output file in act 592: @id "(". In act 592, @id refers to the value of the id attribute of the dclFunction construct (attribute 234 of FIG. 3). The first dclParam construct (construct 240 of FIG. 3) of the dclFunction construct is selected and a temporary variable "item" is set equal to the selected dclParam construct (act 594). The selected dclParam construct is then transformed using the codegen-declare mode (act 596).

Figure 15:
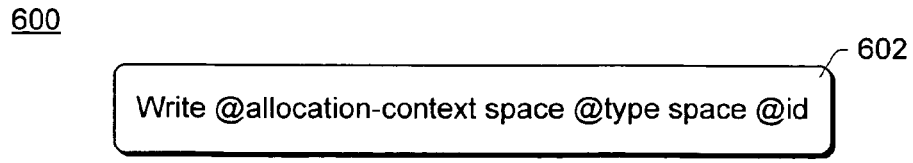
FIG. 15 is a flowchart illustrating an exemplary process for transforming a dclParam construct into a C++ function and method parameter declaration.

FIG. 15 is a flowchart illustrating an exemplary process 600 for transforming a dclParam construct into a C/C++ function and method parameter declaration. The process 600 is for transforming a dclParam construct using the codegen-declare mode.

In process 600, the following (act 602) is written to the output file: @allocation-context space @type space @id. In act 602, @allocation-context refers to the value of the allocation context attribute of the dclParam construct (attribute 246 of FIG. 3), @type refers to the value of the type attribute of the dclParam construct (attribute 244 of FIG. 3), and @id refers to the value of the id attribute of the dclParam construct (attribute 242 of FIG. 3). Table XXIX below shows an example dclParam construct from Table III above, and Table XXX below shows the example dclParam construct of Table XXIX transformed using the process of FIG. 15.

TABLE XXIX

<dclParam id="pZSDesc" type="ZONESTATDESC*" allocation-context="IN"/>

TABLE XXX

IN ZONESTATDESC* pZSDesc

Returning to FIG. 10, a check made as to whether the selected dclParam construct is the last dclParam construct in the dclFunction construct (act 606). If the selected dclParam construct is not the last dclParam construct in the dclFunction construct, then a comma followed by a space is written to the output file (act 608), and processing returns to act 594 to select the next dclParam construct. However, if the selected dclParam construct is the last dclParam construct in the dclFunction construct, then a closing parenthesis followed by a semicolon is written to the output file (act 610).

Table XXXI below shows the example dclFunction construct of Table III transformed using the process of FIG. 10.

Figure 11A:
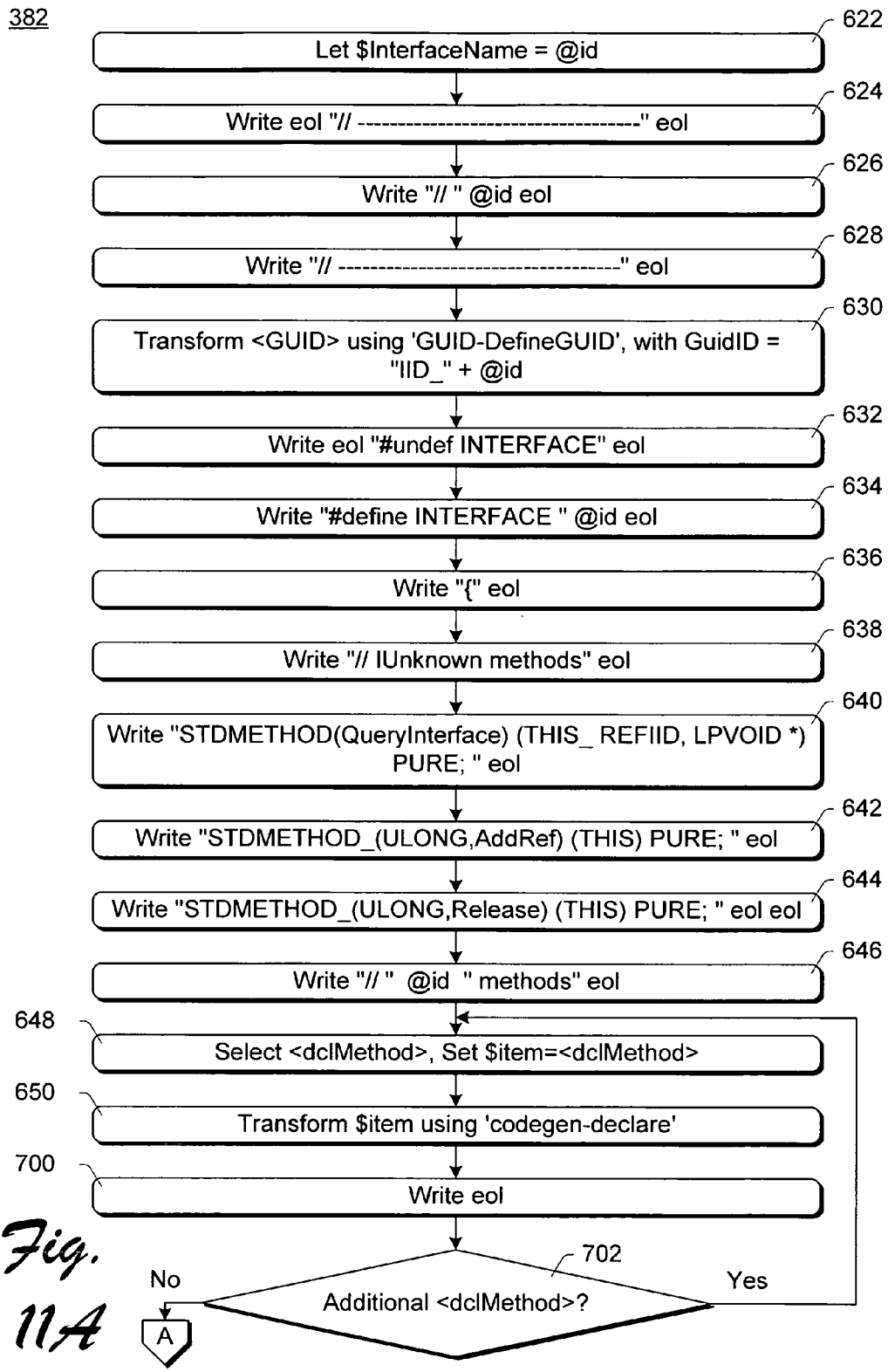
FIGS. 11a, 11b, and 11c are a flowchart illustrating an exemplary process for transforming a dclInterface construct into a COM interface declaration.
Figure 11B:
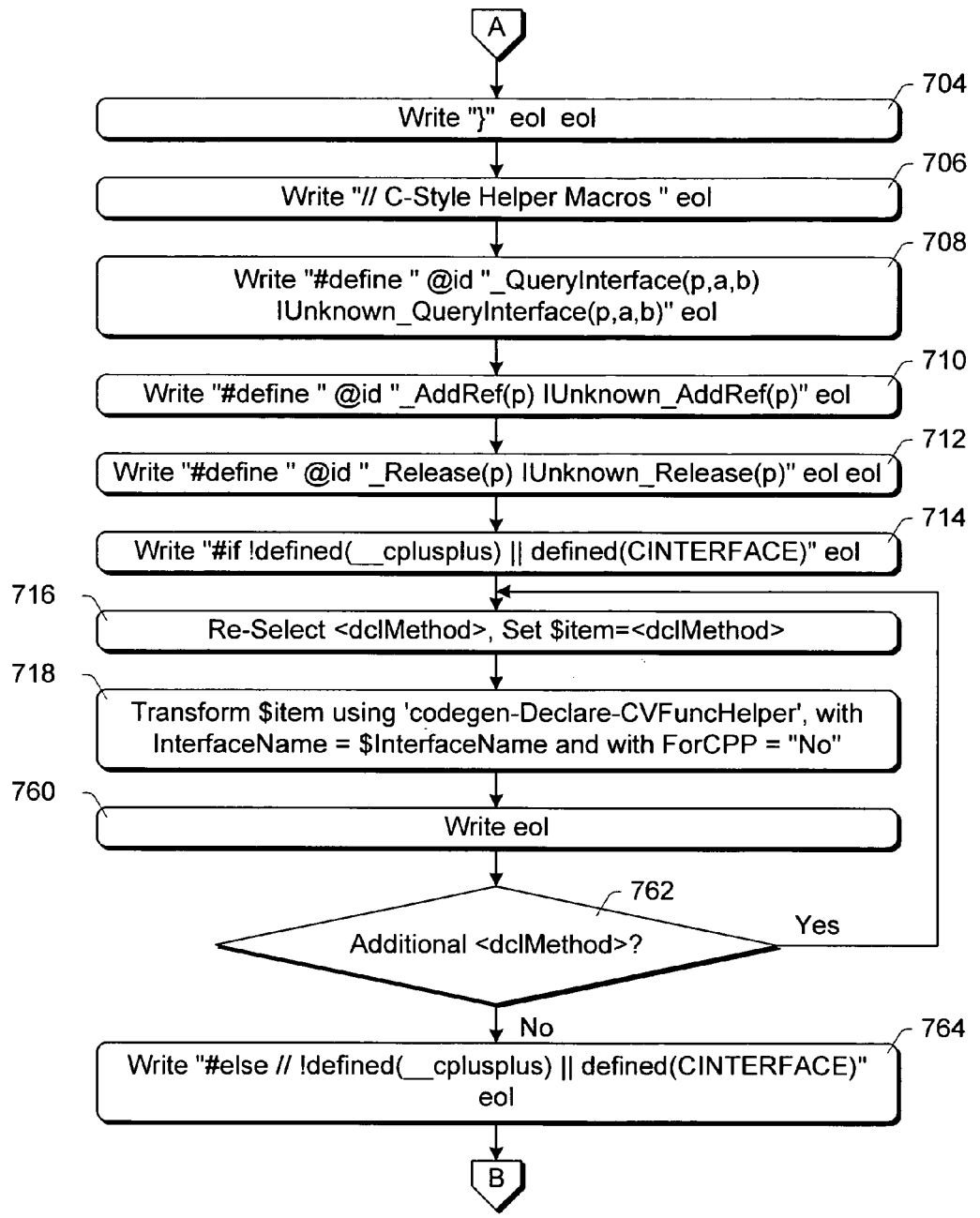
Figure 11C:
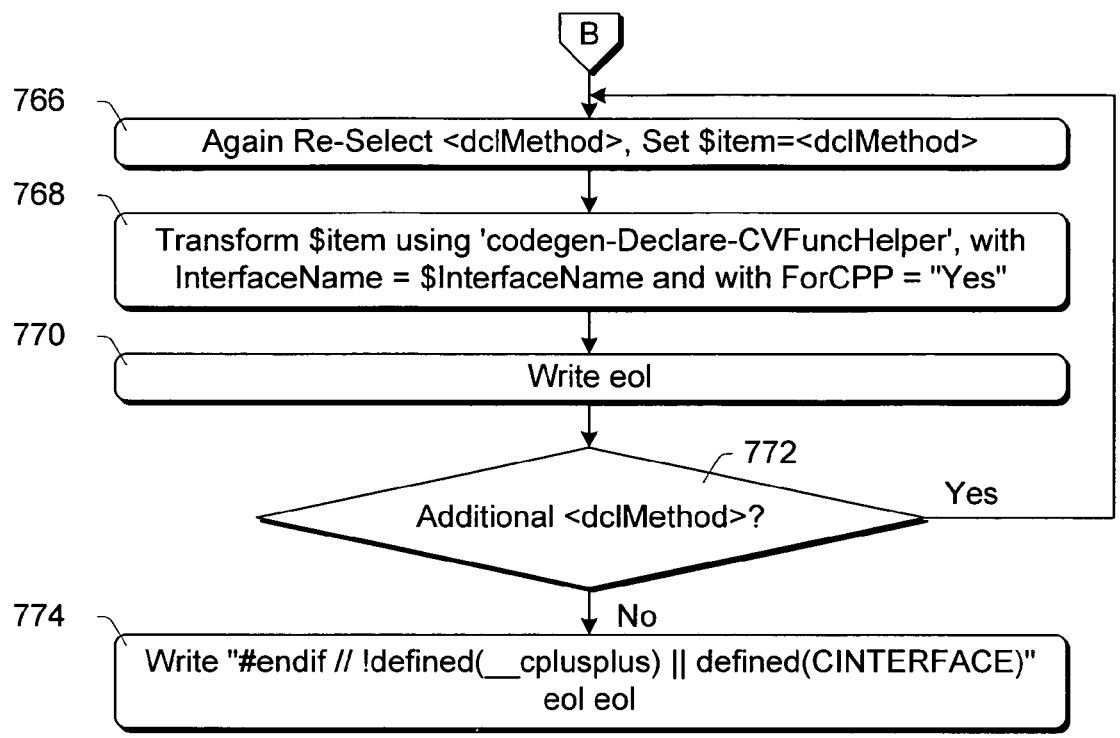

TABLE XXXI extern HRESULT WINAPI ZoneStatCreate( IN ZONESTATDESC* pZSDesc, OUT IZoneStat** ppiZoneStat, IN IUnknown* punkOuter);

FIGS. 11a, 11b, and 11c are a flowchart illustrating an exemplary process 382 for transforming a dclInterface construct into a C/C++ COM interface declaration. The process 382 is for transforming a dclInterface construct using the codegen-declare mode.

Initially, in act 622, a temporary variable "InterfaceName" is set equal to the value @id, where the value @id refers to the value of the id attribute of the dclInterface construct (attribute 256 of FIG. 3). Then the following is written to the output file in act 624: "// ----------------------" eol. In act 626, where @id refers to the value of the id attribute of the dclInterface construct, the following is written to the output file: "// " @id eol. In act 628, the following is written to the output file: "// --------------------" eol.

The GUID construct of the dclInterface construct (construct 264 of FIG. 3) is then transformed using the GUIDDefineGUID mode and with a parameter of GuidID set to "IID_" concatenated with the value of the id attribute of the dclInterface construct (attribute 256 of FIG. 3) (act 630). The transformation process of act 630 is discussed in more detail above with reference to FIG. 13. The following is then written to the output file in act 632: "#undef INTERFACE" eol. In act 634, the following is written to the output file: "#define INTERFACE" @id eol. In act 634, @id refers to the value of the id attribute of the dclInterface construct (attribute 256 of FIG. 3). An opening bracket and eol are then written to the output file in act 636, and in act 638 the following is written to the output file: "// IUnknown methods" eol.

In act 640, the following is written to the output file: "STDMETHOD(QueryInterface) (THIS_REFIID, LPVOID *) PURE; " eol. In act 642, the following is written to the output file: "STDMETHOD_(ULONG,AddRef) (THIS) PURE; " eol. In act 644, the following is written to the output file: "STDMETHOD_(ULONG,Release) (THIS) PURE; " eol eol. In act 646, the following is written to the output file: "// " @id " methods" eol. In act 646, @id refers to the value of the id attribute of the dclInterface construct (attribute 256 of FIG. 3).

The first dclMethod construct of the dclInterface construct (construct 262 of FIG. 3) is then selected and set equal to a temporary variable "item" (act 648). The selected dclMethod construct is then transformed using the codegen-declare mode (act 650).

Figure 16:
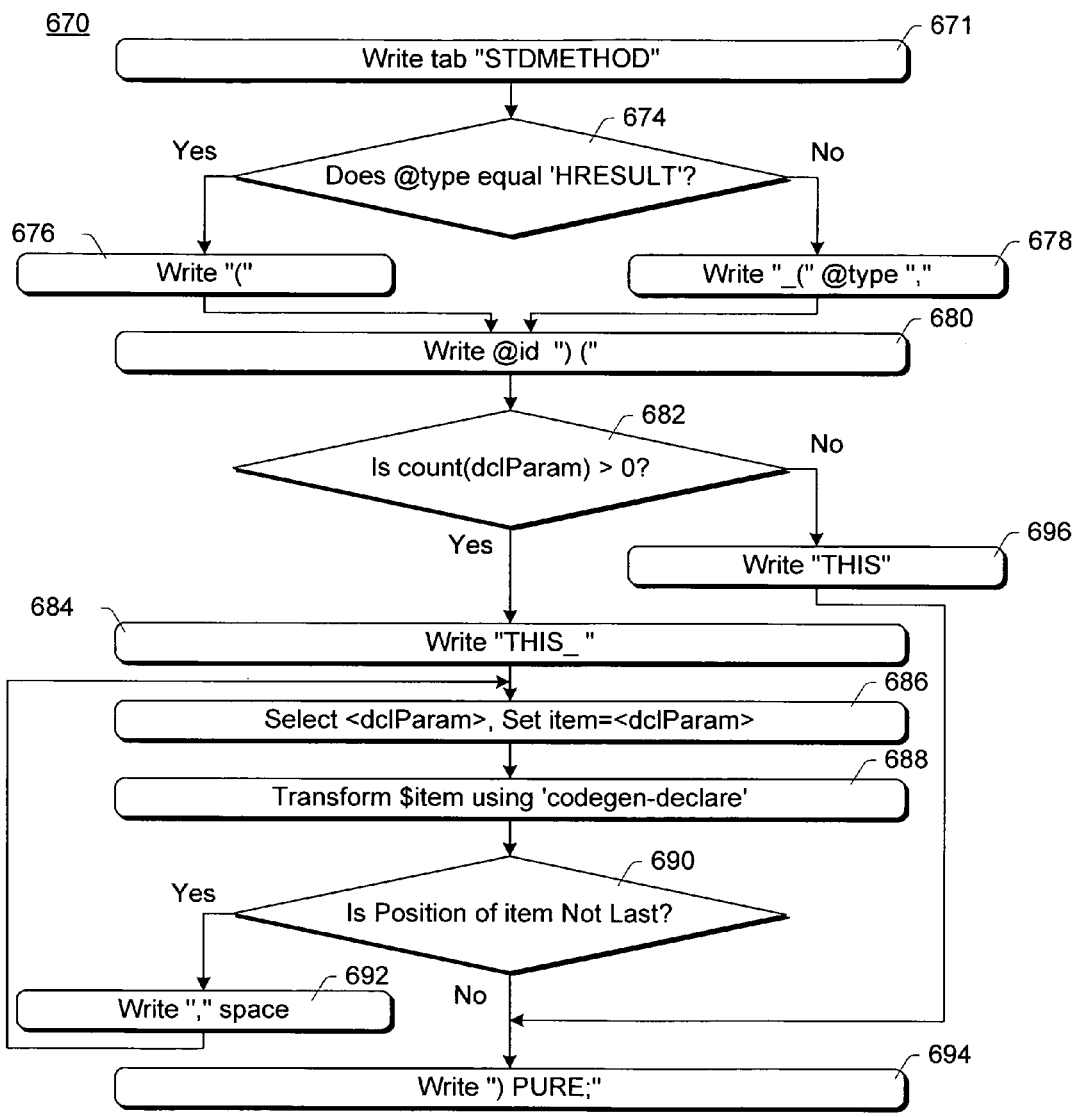
FIG. 16 is a flowchart illustrating an exemplary process for transforming a dclMethod construct into a C++ method declaration within a class or interface declaration.

FIG. 16 is a flowchart illustrating an exemplary process 670 for transforming a dclMethod construct into a C++ method declaration within a class or interface declaration. The process 670 is for transforming a dclMethod construct using the codegen-declare mode.

Initially a tab following by "STDMETHOD" is written to the output file (act 672). A check is then made as to whether the type attribute of the dclMethod construct (attribute 268 of FIG. 3) is equal to "HRESULT" (act 674). If the type attribute is equal "HRESULT", then an opening parenthesis is written to the output file (act 676). However, if the type attribute is not equal to "HRESULT", then the following is written to the output file in act 678: "_(" @type ",". In act 678, @type refers to the value of the type attribute of the dclMethod construct (attribute 268 of FIG. 3).

Then, in act 680, the following is written to the output file: @id ") (". In act 680, @id refers to the value of the id attribute of the dclMethod construct (attribute 266 of FIG. 3). A check is then made as to whether there are any dclParam constructs (construct 270 of FIG. 3) in the dclMethod construct (act 682). If there is at least one dclParam construct in the dclMethod construct, then "THIS_" is written to the output file (act 684). The first dclParam construct in the dclMethod construct is selected and a temporary variable "item" is set equal to the selected dclParam construct (act 686). The selected dclParam construct is then transformed using the codegen-declare mode (act 688). The transformation process of act 688 is discussed in more detail above with reference to FIG. 15 (except that the dclParam construct is part of a dclInterface construct (and having attributes 272-278) rather than part of the dclFunction construct).

A check is then made as to whether the selected dclParam construct is the last dclParam construct in the dclMethod construct (act 690). If the dclParam construct is not the last dclParam construct in the dclMethod construct, then a comma followed by a space is written to the output file (act 692) and processing returns to act 686 to select the next dclParam construct in the dclMethod construct. However, if the dclParam construct is the last dclParam construct in the dclMethod construct, then in act 694 the following is written to the output file: ") PURE;".

Returning to act 682, if there are no dclParam constructs in the dclMethod construct, then "THIS" is written to the output file (act 696) followed by ") PURE;" (act 694).

Table XXXII below shows an example dclMethod construct of Table V above, and Table XXXIII below shows the example dclMethod construct of Table XXXII transformed using the process of FIG. 16.

TABLE XXXII

<dclMethod id="CreateLog" type="HRESULT">
  <dclParam id="pLogDesc" type="ZSLOGDESC*" allocation-context="IN"/>
  <dclParam id="ppiLog" type="IZSLog**" allocation-context="OUT"/>

TABLE XXXII-continued

```
<dclParam id="punkOuter" type="Iunknown*"
allocation-context="IN"/>
</dclMethod>
```

TABLE XXXIII

```
STDMETHOD(CreateLog) (THIS_ IN ZSLOGDESC*
pLogDesc, OUT IZSLog**
ppiLog, IN IUnknown* punkOuter) PURE;
```

Returning to FIG. 11a, after transforming the selected dclMethod construct, an eol is written to the output file (act 700) and a check made as to whether there are any additional dclMethod constructs in the dclInterface construct (act 702). If there are additional dclMethod constructs in the dclInterface construct, then processing returns to act 648 to select the next dclMethod construct. However, if there are no additional dclMethod constructs in the dclInterface construct, then a closing bracket followed by two eol's are written to the output file (act 704 of FIG. 11b).

In act 706, the following is written to the output file: "// C-Style Helper Macros " eol. In act 708, the following is written to the output file: "#define " @id "_QueryInterface (p,a,b) IUnknown_QueryInterface(p,a,b)" eol. In act 710, the following is written to the output file: "#define " @id "_AddRef(p) IUnknown_AddRef(p)" eol. In act 712, the following is written to the output file: "#define " @id "_Release(p) IUnknown_Release(p)" eol. In acts 710 and 712, @id refers to the value of the id attribute of the dclInterface construct (attribute 256 of FIG. 3). In act 714, the following is written to the output file: "#if !defined (_cplusplus) || defined(CINTERFACE)" eol.

The first dclMethod construct in the dclInterface construct is then re-selected and set equal to the temporary variable "item" (act 716). The re-selected dclMethod construct is transformed using the codegen-Declare-CVFuncHelper mode, and with parameters of the InterfaceName (from act 622 above) and with a value For CPP set equal to "no" (act 718).

Figure 17:
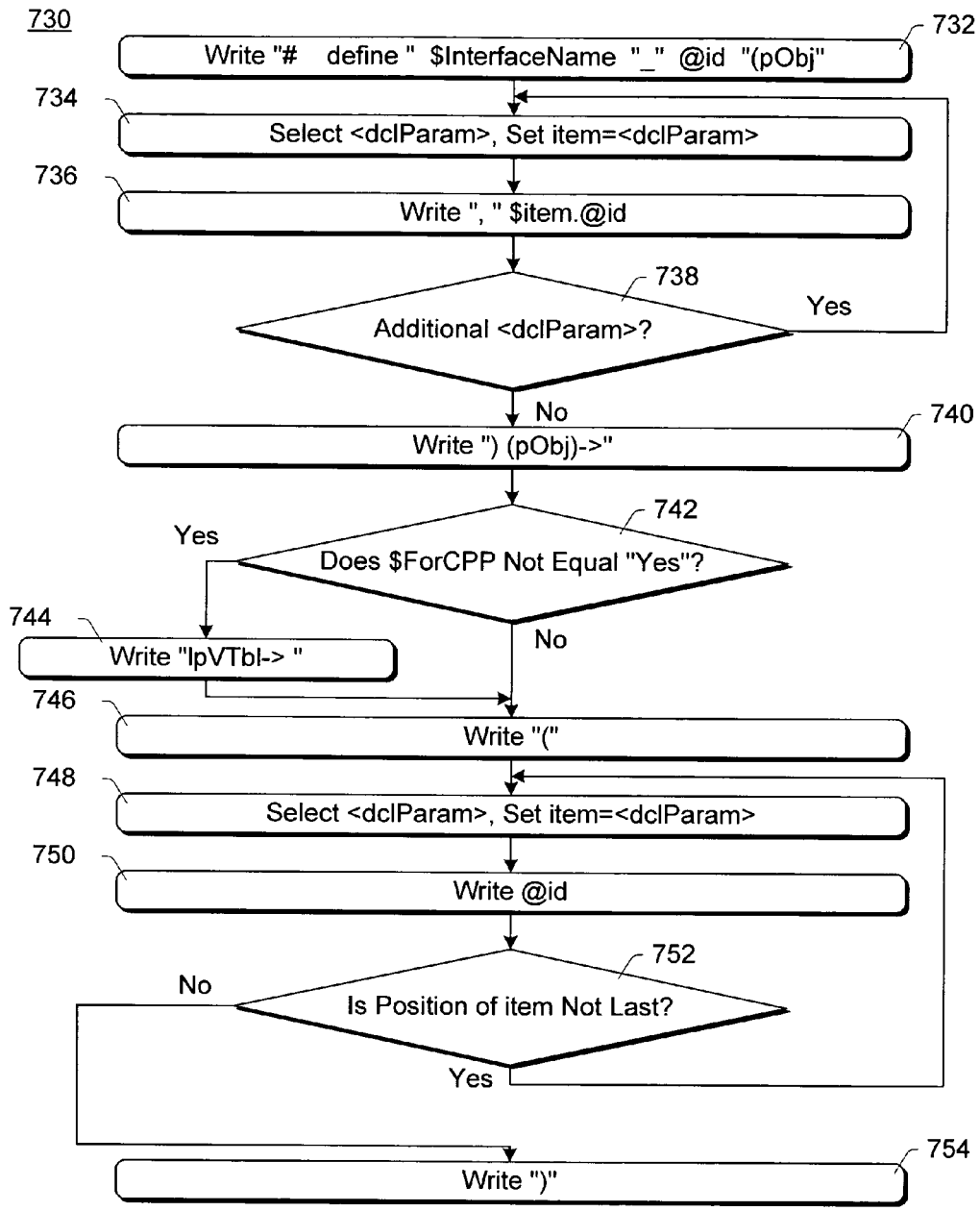
FIG. 17 is a flowchart illustrating an exemplary process for transforming a dclMethod construct into DirectX style C helper macros.

FIG. 17 is a flowchart illustrating an exemplary process 730 for transforming a dclMethod construct into DirectX style C helper macros. The process 730 is for transforming a dclMethod construct using the codegen-declare-CVFuncHelper mode.

Initially, in act 732, the following is written to the output file: "# define " $InterfaceName "_" @id "(pObj". In act 732, $InterfaceName is the received interfacename parameter, and @id is the value of the id attribute of the dclMethod construct (attribute 266 of FIG. 3). The first dclParam construct of the dclMethod is then selected and set equal to a temporary variable "item" (act 734). The following is then written to the output file in act 736: ", " $item.@id. In act 736, $item.@id refers to the value of the id attribute of the selected dclParam construct (attribute 272 of FIG. 3). A check is then made as to whether there are any additional dclParam constructs in the dclMethod construct (act 738). If there are additional dclParam constructs in the dclMethod construct, then processing returns to act 734 to select the next dclParam construct.

However, if there are no additional dclParam constructs in the dclMethod construct, then the following is written to the output file in act 740: ") (pObj)->". A check is then made as to whether the received parameter For CPP is not equal to "yes" (act 742). If the received parameter For CPP is not equal to "yes", then the following is written to the output file in act 744: write "lpVTbl->". Regardless of whether the received parameter ForCPP is not equal to "yes", an opening parenthesis is written to the output file (act 746). The first dclParam construct is then re-selected and set equal to a temporary variable (act 748). The id attribute of the re-selected dclParam construct (attribute 272 of FIG. 3) is written to the output file (act 750), and a check is made as to whether the re-selected dclParam construct is the last dclParam construct in the dclMethod construct (act 752). If the re-selected dclParam construct is not the last dclParam construct, then process returns to act 748 for re-selection of the next dclParam construct. However, if the re-selected dclParam construct is the last dclParam construct, then a closing parenthesis is written to the output file (act 754).

Table XXXIV below shows the example dclMethod construct of Table XXXII above transformed using the process of FIG. 17, with the InterfaceName parameter set to "IZoneStat" and the ForCPP parameter set to "no".

TABLE XXXIV

```
define IZoneStat_CreateLog(pObj, pLogDesc, ppiLog, punkOuter)
(pObj)->lpVtbl->(pLogDesc, ppiLog, punkOuter)
```

Returning to FIG. 11b, after transforming the dclMethod construct in act 718, an eol is written to the output file (act 760). A check is then made as to whether there are any additional dclMethod constructs that have not yet been re-selected in act 716 (act 762). If there are any additional dclMethod constructs that have not yet been re-selected, then processing returns to act 716 to re-select the next dclMethod construct. However, if there are not any additional dclMethod constructs that have not yet been re-selected, then the following is written to the output file in act 764: "#else // !defined(_cplusplus) || defined(CINTERFACE)" eol.

The first dclMethod construct of the dclInterface construct (construct 262 of FIG. 3) is again re-selected and set equal to a temporary variable "item" (act 766 of FIG. 11c). The again re-selected dclMethod construct is transformed using the codegen-Declare-CVFuncHelper mode, and with parameters of the InterfaceName (from act 622 above) and with a value ForCPP set equal to "yes" (act 768). The transformation process of act 768 is discussed above with reference to FIG. 17. Table XXXV below shows the example dclMethod construct of Table XXXII above transformed using the process of FIG. 17, with the InterfaceName parameter set to "IZoneStat" and the For CPP parameter set to "yes".

TABLE XXXV

```
define IZoneStat_CreateLog(pObj, pLogDesc, ppiLog, punkOuter)
(pObj)->(pLogDesc, ppiLog, punkOuter)
```

After transforming the dclMethod construct in act 768, an eol is written to the output file (act 770). A check is then made as to whether there are any additional dclMethod constructs that have not yet been again re-selected in act 766 (act 772). If there are any additional dclMethod constructs that have not yet been again re-selected, then processing returns to act 766 to again re-select the next dclMethod construct. However, if there are not any additional dclMethod constructs that have not yet been again re-selected, then the following is written to the output file in act 774: "#endif // !defined(_cplusplus) || defined(CINTER-FACE)" eol eol.

As discussed above, in addition to transforming an APISL document 102 of FIG. 1 into a COM API header file as discussed with reference to FIGS. 4-17 above, document 102 can also be transformed into different output files. One such additional output file is a file that maps enumeration integral values to their respective string values. Such an output file can be valuable to designers because situations can arise (e.g., during the debugging process) where it is helpful for a designer to know what string values the different integral values of an enumeration correspond to. For example, during the debugging process, a trace log may be generated that identifies to the designer that a particular function was called with a value of "0×01". While this may help the designer, he or she is often not aware of what the value "0×01" represents and must look through the program being debugged to determine what the value "0×01" represents. However, if the value "0×01" were mapped to its enumeration string value (e.g., ZSREPORT_ACTIVE from Table II), then the designer could readily identify what the value "0×01" represents.

Figure 18:
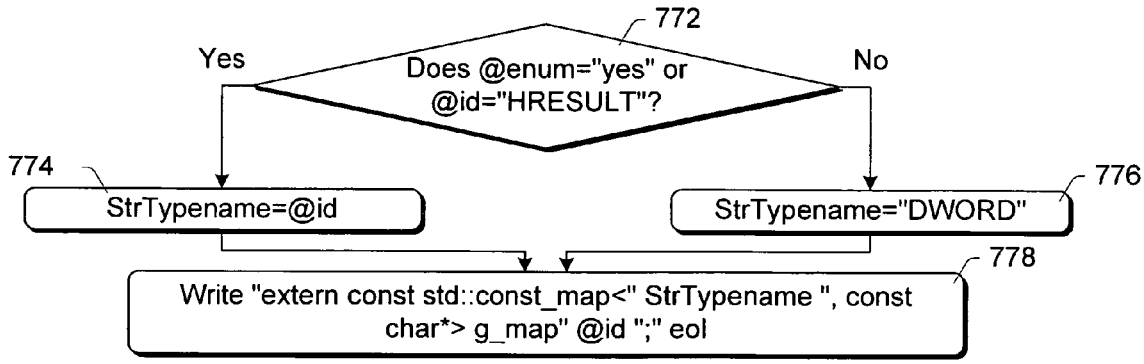
FIG. 18 illustrates an exemplary process for generating a declaration section for an enumeration mapping output file.
Figure 19:
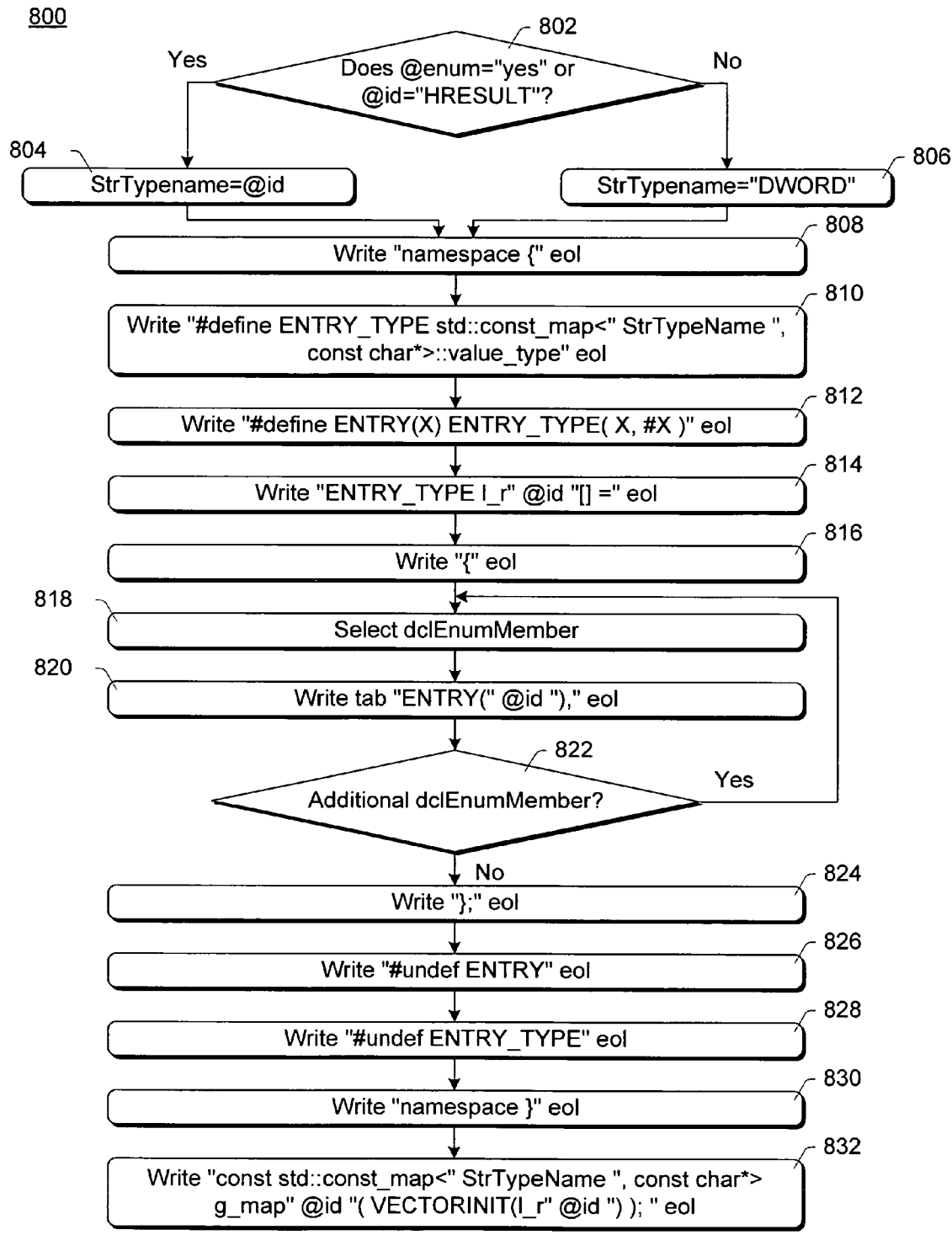
FIG. 19 illustrates an exemplary process for generating a definitions section for an enumeration mapping output file.

FIGS. 18 and 19 represent exemplary processes for transforming an APISL document into a mapping of enumeration integral values to their respective string values. The processes of FIGS. 18 and 19, as defined in a transformation module (e.g., transformation instructions 104, 106 of FIG. 1), are carried out by a transformation engine (e.g., engine 108 of FIG. 1) and may be performed in software.

FIG. 18 illustrates an exemplary process 770 for generating a declaration section for the enumeration mapping output file. Initially, a check is made as to whether the enum attribute value of the enumeration (attribute 226 of FIG. 3) is equal to "yes" or whether the id attribute value of the enumeration (attribute 224 of FIG. 3) is equal to "HRESULT" (act 772). If either the enum attribute value of the enumeration is "yes" or the id attribute value of the enumeration is "HRESULT", then a temporary variable "StrTypename" is set equal to the value of the id attribute of the enumeration (act 774); otherwise, the temporary variable "StrTypename" is set equal to the value "DWORD" (act 776). The following is then written to the output file in act 778: "extern const std::const_map<" StrTypename ", const char*> g_map" @id ";" eol. In act 778, StrTypename represents the value assigned to the temporary variable in either act 774 or 776, and @id represents the value of the id attribute of the enumeration (attribute 224 of FIG. 3).

FIG. 19 illustrates an exemplary process 800 for generating a definitions section for the enumeration mapping output file. Initially, a check is made as to whether the enum attribute value of the enumeration (attribute 226 of FIG. 3) is equal to "yes" or whether the id attribute value of the enumeration (attribute 224 of FIG. 3) is equal to "HRESULT" (act 802). If either the enum attribute value of the enumeration is "yes" or the id attribute value of the enumeration is "HRESULT", then a temporary variable "StrTypename" is set equal to the value of the id attribute of the enumeration (act 804); otherwise, the temporary variable "StrTypename" is set equal to the value "DWORD" (act 806). The following is then written to the output file in act 808: "namespace {" eol. In act 810, the following is written to the output file: "#define ENTRY_TYPE std::const_map<" StrTypeName ", const char*>::value_type" eol. In act 810, StrTypename represents the value assigned to the temporary variable in either act 804 or 806.

The following is then written to the output file in act 812: "#define ENTRY(X) ENTRY_TYPE(X, #X)" eol. In act 814, the following is written to the output file: "ENTRY_TYPE 1_r" @id "[ ]=" eol. In act 814, @id represents the value of the id attribute of the enumeration (attribute 224 of FIG. 3). An opening bracket and eol are then written to the output file (act 816).

The first dclEnumMember construct in the dclEnumeration construct (construct 228 of FIG. 3) is then selected (act 818). The following is then written to the output file in act 820: tab "ENTRY(" @id ")," eol. In act 820, @id refers to the value of the id attribute of the dclEnumMember construct (attribute 230 of FIG. 3). A check is then made as to whether there are any additional dclEnumMember constructs that have not yet been selected in act 818 (act 822). If there are additional dclEnumMember constructs in the dclEnumeration construct that have not yet been selected, then processing returns to act 818 to select the next dclEnumMember construct.

However, if there are no additional dclEnumMember constructs in the dclEnumeration construct that have not yet been selected, a closing bracket and semicolon followed by an eol are written to the output file (act 824). In act 826, the following is written to the output file: "#undef ENTRY" eol. In act 828, the following is written to the output file: "#undef ENTRY_TYPE" eol. In act 830, the following is written to the output file: "namespace }" eol. And, in act 832, the following is written to the output file: "const std::const_map<" StrTypeName ", const char*> g_map" @id "(VECTORINIT(1_r" @id ")); " eol. In act 832, StrTypeName represents the value assigned to the temporary variable in either act 804 or 806, and @id represents the value of the id attribute of the dclEnumeration construct (attribute 224 of FIG. 3). In act 832, the value VECTORINIT is previously defined as "#define VECTORINIT(A) &A[0], &(A[sizeof (A)/sizeof(A[0])])".

The code that is generated based on the transformed mapping (from processes 770 and 800) is dependent upon the code that is generated for the API C++ header file (based on the transformation of process 350 of FIGS. 4a and 4b), with a compiler binding the values of the enumeration members using the enumeration members' names. For example, suppose an APISL document has a dclEnum named "SomeEnum" that has a dclEnumMember named "SomeEnumEntry". Process 800 will expand this dclEnumMember to "ENTRY(SomeEnumEntry)," followed by an end-of-line. The C++ compiler preprocessor will then expand the ENTRY macro when the file is compiled to:

std::const_map<DWORD, const char*>::value_type
     (SomeEnumnEntry, 'SomeEnumEntry')

The compiler knows what the value of the symbol "SomeEnumEntry" is because it has already seen the symbol declared in the API C++ header file that was generated in process 350 of FIGS. 4a and 4b.

Table XXXVI below shows the example enumeration construct of Table II above transformed into a mapping of enumeration integral values to their respective string values using the process of FIGS. 18 and 19.

TABLE XXXVI

```
// ZoneStatUty::g_mapZSREPORTSTATUS
namespace
{
#   define ENTRY_TYPE std::const_map<DWORD,
ASCII::PCSZ>::value_type
```

TABLE XXXVI-continued

```
#  define ENTRY(X) ENTRY_TYPE( X, #X )
    ENTRY_TYPE 1_rZSREPORTSTATUS[ ] =
    {
      ENTRY(ZSREPORT_ACTIVE),
      ENTRY(ZSREPORT_INACTIVE),
      ENTRY(ZSREPORT_DISABLED),
    };
#  undef ENTRY_TYPE
#  undef ENTRY
  }
  namespace ZoneStatUty
  {
    const std::const_map<DWORD, ASCII::PCSZ>
      g_mapZSREPORTSTATUS(VECTOR(l_rZSREPORTSTATUS));
  }
```

Figure 20:
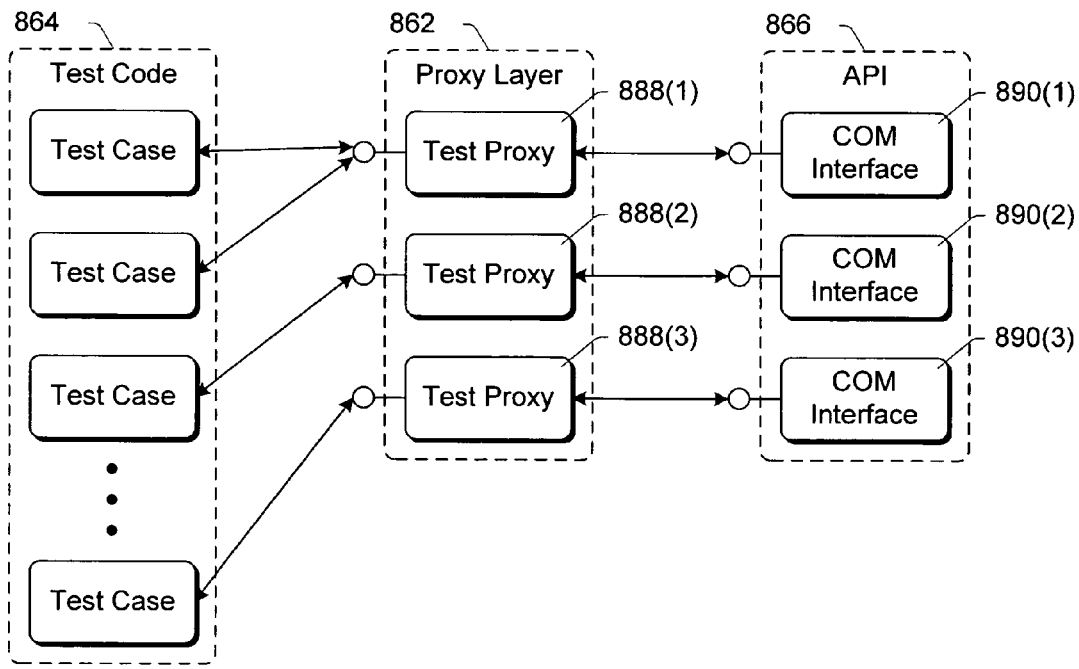
FIG. 20 illustrates an exemplary system in which a test proxy file can be used.

Another type of output file that document 102 of FIG. 1 can be transformed into is a proxy object file. FIG. 20 illustrates an exemplary system 860 in which a test proxy object file can be used. The test proxy object file implements a proxy layer 862, which is situated between a test code set 864 and an API 866. Test proxy layer 862 provides an abstraction for testing whether a COM function or method (in API 866) adheres to a particular contract of behavior, and also whether a COM function returns the expected HRESULT. Test proxy layer 862 includes multiple test proxy objects 888 which allow corresponding COM interfaces 890 to be accessed by test code 864.

Designers of API 866 can generate test code set 864 to test various features and aspects of API 866. The exact nature of this test code set 864 will depend on the particular designers and the functionality of API 866. However, by having test proxy layer 862 automatically generated, the designers are alleviated of the burden of checking whether the COM functions and methods of API 866 adhere to a particular contract of behavior, and whether the COM functions of API 866 return the expected HRESULT values.

In one implementation, the contract of behavior that COM functions and methods of API 866 must adhere to is related to the use of parameters. Three types of parameters may be used: IN, IN/OUT, and OUT parameters. The behavior which must be adhered to for each type of parameter is as follows. An IN parameter is allocated, set, and freed by the caller of a function or interface method. An IN parameter must not be modified by the called function. An IN/OUT parameter is initially allocated by the caller of a function or interface method, and set, freed, and reallocated, if necessary, by the process that is called. An IN/OUT parameter may be altered by the called function. If the parameter has a value that the called function changes, the previous value must be appropriately freed. If the function/method fails, then the parameter must not be modified by the called function. An OUT parameter is allocated by the function being called, and freed by the caller. If the function succeeds, then an OUT parameter must be modified by the called function. If the function fails, then an OUT parameter must not be modified by the called function.

FIGS. 21 through 25d represent exemplary processes for transforming an APISL document into a test proxy object file. The processes of FIGS. 21 through 25d, as defined in a transformation module (e.g., transformation instructions 104, 106 of FIG. 1), are carried out by a transformation engine (e.g., engine 108 of FIG. 1) and may be performed in software.

Figure 21:
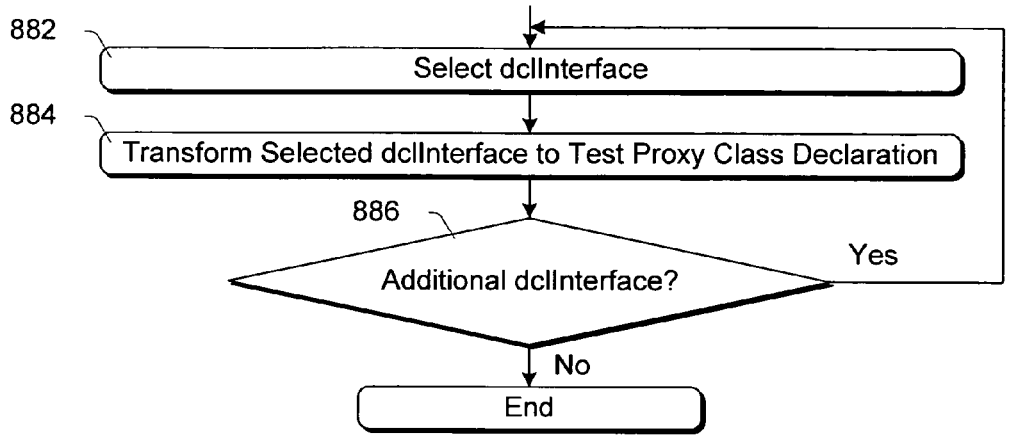
FIG. 21 is a flowchart illustrating an exemplary process for transforming an APISL document into a header section of a test proxy file.

FIG. 21 is a flowchart illustrating an exemplary process 880 for transforming an APISL document into a header section of a test proxy file. Initially, a dclInterface construct of the APISL document is selected (act 882) and transformed to a test proxy class declaration (act 884). A check is then made as to whether there are any additional/dclInterface constructs in the APISL document that have not yet been transformed (act 886). If there are additional dclInterface constructs in the APISL document that have not yet been transformed, then processing returns to act 882 where one of the additional dclInterface constructs is selected for transformation. Otherwise, the process 880 ends.

Figure 22:
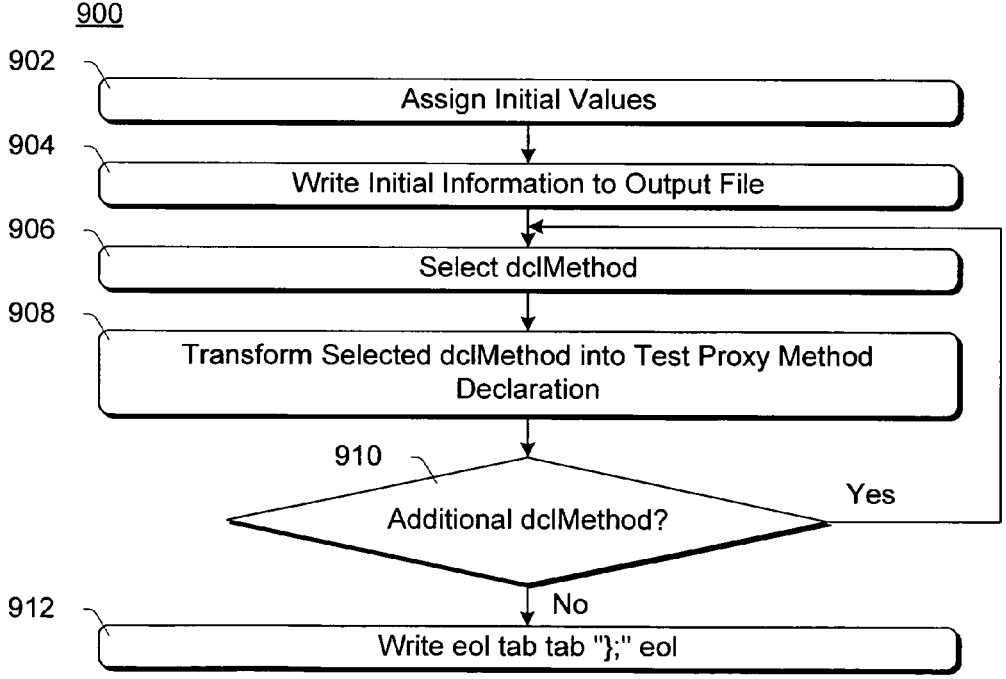
FIG. 22 is a flowchart illustrating an exemplary process for transforming a dclInterface construct to a test proxy class declaration.

FIG. 22 is a flowchart illustrating an exemplary process 900 for transforming a dclInterface construct to a test proxy class declaration. In one implementation, process 900 of FIG. 22 is act 884 of FIG. 21.

Initially, various initial values are assigned (act 902). An example of such initial value assignments in one implementation is shown in Table XXXVII below.

TABLE XXXVII

```
$InterfaceName = @id
$BaseClass = "___CTestProxy<" + @id + ">"
$RefBaseClass = @refBaseClass
```

In Table XXXVII, @id refers to the value of the id attribute of the dclInterface construct (attribute 256 of FIG. 3), and @refBaseClass refers to the value of the refBaseClass construct of the dclInterface construct (construct 260 of FIG. 3).

Initial information is then written to the output file (act 902). An example of such initial information in one implementation is shown in Table XXXVIII below.

TABLE XXXVIII

```
write eol tab tab "SPECIALIZE_CreateINParamSentinel(" @id ");" eol
write eol tab tab "SPECIALIZE_OUTParamSentinel(" @id ");" eol
write "template<> class CTextProxy<" @id "> : public " $BaseClass eol
    "{" eol
    "public:" eol
    tab "typedef CTextProxy<" @id "> this_type;" eol
    eol
    tab "// Contructors" eol
    tab "inline CTestProxy(com_ptr_type& pi, XMLUty::xml_ostream& xout)" eol
    tab " : " $BaseClass "(pi, xout, \"" @id "\")" eol
    tab "{" eol
    tab "}" eol
    eol
    tab "inline CTestProxy(IN " @id "* pi, XMLUty::xml_ostream& xout)" eol
    tab " : " $BaseClass "(pi, xout, \"" @id "\")" eol
```

TABLE XXXVIII-continued

```
tab "{" eol
tab "}" eol
  eol
tab "inline CTestProxy(XMLUty::xml_ostream& xout)" eol
tab " : " $BaseClass "(NULL, xout, \"" @id "\")" eol
tab "{" eol
tab "}" eol
  eol
tab "this_type& operator = (IN TInterface* pi) { Assign(pi); return *this; }" eol
tab "this_type& operator = (IN com_ptr_type& pi) { Assign(pi); return *this; }" eol
```

In Table XXXVIII, @id refers to the value of the id attribute of the dclInterface construct (attribute 256 of FIG. 3), and $BaseClass refers to the $BaseClass value assigned in act 902 (shown in Table XXXVII above).

One of the dclMethod constructs of the dclInterface construct (construct 262 of FIG. 3) is then selected (act 906) and transformed into a test proxy method declaration (act 908). This transformation is discussed in more detail below with reference to FIG. 23. A check is then made as to whether there are any additional dclMethod constructs in the dclInterface construct (act 910). If there are additional dclMethod constructs in the dclInterface construct, then processing returns to act 906 to select and transform one of the additional dclMethod constructs. However, if there are no additional dclMethod constructs in the dclInterface construct, then the following is written to the output file in act 912: eol tab tab "};" eol.

Table XXXIX below shows the example dclInterface construct of Table V above transformed using the process of FIG. 22.

TABLE XXXIX

```
SPECIALIZE_CreateINParamSentinel(IZoneStat);
SPECIALIZE_OUTParamSentinel(IZoneStat);
// ========================================================
// Proxy Class for interface IZoneStat
// ========================================================
template<>
class CTestProxy< IZoneStat > : public___CTestProxy< IZoneStat >
{
public:
  typedef CTestProxy< IZoneStat > this_type;
  // Constructors
  inline CTestProxy(com_ptr_type& pi, XMLUty::xml_ostream& xout)
    : ___CTestProxy< IZoneStat >(pi, xout, "IZoneStat")
  {
  }
  // Constructors
  inline CTestProxy(IN IZoneStat* pi, XMLUty::xml_ostream& xout)
    : ___CTestProxy< IZoneStat >(pi, xout, "IZoneStat")
  {
  }
  // Constructors
  inline CTestProxy(XMLUty::xml_ostream& xout)
    : ___CTestProxy< IZoneStat >(NULL, xout, "IZoneStat")
  {
  }
  this_type& operator = (IN TInterface* pi) { Assign(pi); return *this; }
  this_type& operator = (IN com_ptr_type& pi) { Assign(pi); return *this; }
      eTestResult Initialize(HRESULT _hrExpected, OUT HRESULT& _hrActual, IN ZONESTATDESC* pZSDesc);
      eTestResult GetDescription(HRESULT _hrExpected, OUT HRESULT& _hrActual, OUT ZONESTATDESC* pZSDesc);
      eTestResult CreateLog(HRESULT _hrExpected, OUT HRESULT& _hrActual, IN ZSLOGDESC* pLogDesc, OUT IZSLog** ppiLog, IN IUnknown* punkOuter);
      eTestResult GetReportStatus(HRESULT _hrExpected, OUT HRESULT& _hrActual, OUT DWORD* pdwStatus);
      eTestResult SubmitReport(HRESULT _hrExpected, OUT HRESULT& _hrActual, IN ZSREPORTDESC* pReportDesc, OUT IZSReportStatus** ppiReportSubmit, IN IUnknown* punkOuter);
      eTestResult CreateQuery(HRESULT _hrExpected, OUT HRESULT& _hrActual, IN ZSQUERYDESC* pQueryDesc, OUT IZSQuery** ppiLog, IN IUnknown* punkOuter);
};
```

Figure 23:
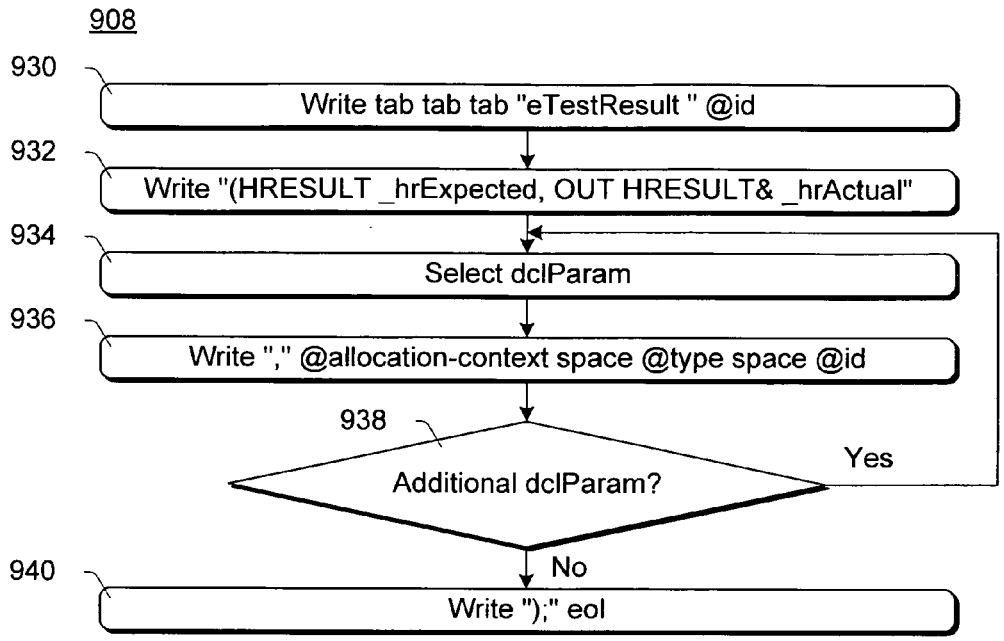
FIG. 23 is a flowchart illustrating an exemplary process for transforming a dclMethod construct to a test proxy method declaration.

FIG. 23 is a flowchart illustrating an exemplary process 908 for transforming a dclMethod construct to a test proxy method declaration. Initially, the following is written to the output file in act 930: tab tab tab "eTestResult " @id. In act 930, @id refers to the value of the id attribute of the dclMethod construct (attribute 266 of FIG. 3). The following is then written to the output file in act 932: "(HRESULT _hrExpected, OUT HRESULT& _hrActual".

A dclParam construct of the dclMethod construct (construct 270 of FIG. 3) is then selected (act 934), and the following is written to the output file in act 936: "," @allocation-context space @type space @id. In act 936, @allocation-context refers to the value of the allocation-context attribute of the dclParam construct (attribute 276 of FIG. 3), @type refers to the value of the type attribute of the dclParam construct (attribute 274 of FIG. 3), and @id refers to the value of the id attribute of the dclParam construct (attribute 272 of FIG. 3). A check is then made as to whether there are any additional dclParam constructs in the dclMethod construct (act 938). If there are additional dclParam constructs in the dclMethod construct, then processing returns to act 934 to select one of the additional dclParam constructs. However, if there are no additional dclParam constructs in the dclMethod construct, then a closing parenthesis, semicolon, and eol is written to the output file (act 940).

Table XL below shows an example dclMethod construct of a dclInterface construct, and Table XLI below shows the example dclMethod construct of Table XL transformed using the process of FIG. 23.

TABLE XL

```
<dclInterface id="IZoneStat" hungarian-id="ZONESTAT">
  ...
  <dclMethod id="GetReportStatus" type="HRESULT">
    <dclParam id="pdwStatus" type="DWORD*"
      domain="ZSREPORTSTATUS*" allocation-context="OUT"/>
  </dclMethod>
  ...
</dclInterface>
```

Figure 24:
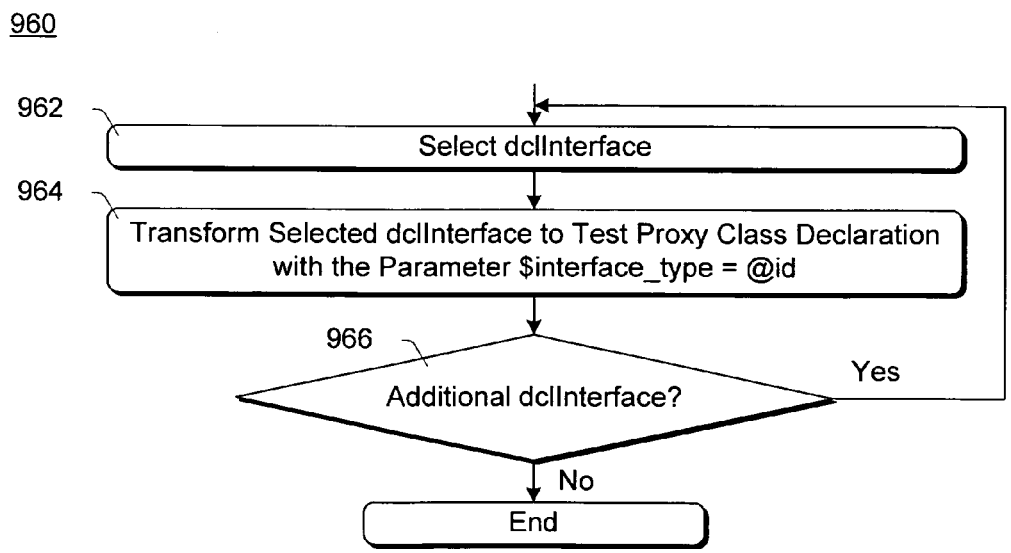
FIG. 24 is a flowchart illustrating an exemplary process for transforming an APISL document into a source section of a test proxy file.

TABLE XLI eTestResult GetReportStatus(HRESULT _hrExpected, OUT HRESULT& _hrActual, OUT DWORD* pdwStatus);

FIG. 24 is a flowchart illustrating an exemplary process 960 for transforming an APISL document into a source section of a test proxy file. The header section generated in process 880 of FIG. 21 above and the source section generated in process 960 may be different sections in the same test proxy file, or alternatively may be different test proxy files that together (possibly in combination with one or more other files) implement the test proxy layer 862 of FIG. 20.

Initially, a dclInterface construct of the APISL document is selected (act 962) and transformed to a test proxy class declaration with the parameter $interface_type=@id (act 964). In act 964, @id refers to the value of the id attribute of the dclInterface construct (attribute 256 of FIG. 3). The transformation of the dclInterface construct in act 964 is process 900 of FIG. 22, except that the parameter $interface_type=@id is included and used to transform the dclMethod constructs (act 906 of FIG. 22), as discussed in more detail below with reference to FIGS. 25*a* through 25*d*.

A check is then made as to whether there are any additional dclInterface constructs in the APISL document that have not yet been transformed (act 966). If there are additional dclInterface constructs in the APISL document that have not yet been transformed, then processing returns to act 962 where one of the additional dclInterface constructs is selected for transformation. Otherwise, the process 960 ends.

FIGS. 25*a*, 25*b*, 25*c*, and 25*d* are a flowchart illustrating an exemplary process 1000 for transforming a dclMethod construct to a test proxy method definition. Process 1000 receives a parameter of $interface_type (from act 964 of FIG. 24).

Initially, the following is written to the output file in act 1002: eol tab tab "eTestResult CTestProxy<" $interface_type ">::" @id "HRESULT _hrExpected, OUT HRESULT& _hrActual". In act 1002, $interface_type is the received parameter value $interface_type, and @id is the value of the id attribute of the dclMethod construct (attribute 266 of FIG. 3). A dclParam construct of the dclMethod construct is then selected (act 1004), and the following is written to the output file in act 1006: "," @allocation-context space @type space @id. In act 1006, @allocation-context refers to the value of the allocation-context attribute of the dclParam construct (attribute 276 of FIG. 3), @type refers to the value of the type attribute of the dclParam construct (attribute 274 of FIG. 3), and @id refers to the value of the id attribute of the dclParam construct (attribute 272 of FIG. 3). A check is then made as to whether there are any additional dclParam constructs in the dclMethod construct (act 1008). If there are additional dclParam constructs in the dclMethod construct, then processing returns to act 1004 to select one of the additional dclParam constructs. However, if there are no additional dclParam constructs in the dclMethod construct, then additional information is written to the output file (act 1010). In act 1010, @id refers to the value of the id attribute of the dclParam construct (attribute 272 of FIG. 3).

A check is then made as to whether there is at least one dclParam construct in the dclMethod construct (construct 270 of FIG. 3) with the value of the @allocation-context attribute (attribute 276 of FIG. 3) being "IN" (act 1012). If there is at least one such dclParam construct, then one such dclParam construct is selected (act 1014), and the following is written to the output file in act 1016: tab tab tab "CINParamSentinalPtr pINParam_" @id "=CreateINParamSentinel(" @id ");" eol. In act 1016, @id refers to the value of the id attribute of the selected dclParam construct (attribute 272 of FIG. 3). A check is then made as to whether there are any additional dclParam constructs in the dclMethod construct with the value of the @allocation-context attribute being "IN" that have not yet been selected in act 1014 (act 1018). If there are any additional dclParam constructs in the dclMethod construct with the value of the @allocation-context attribute being "IN" that have not yet been selected in act 1014, then processing returns to act 1014 to select one of the additional dclParam constructs.

Figure 25A:
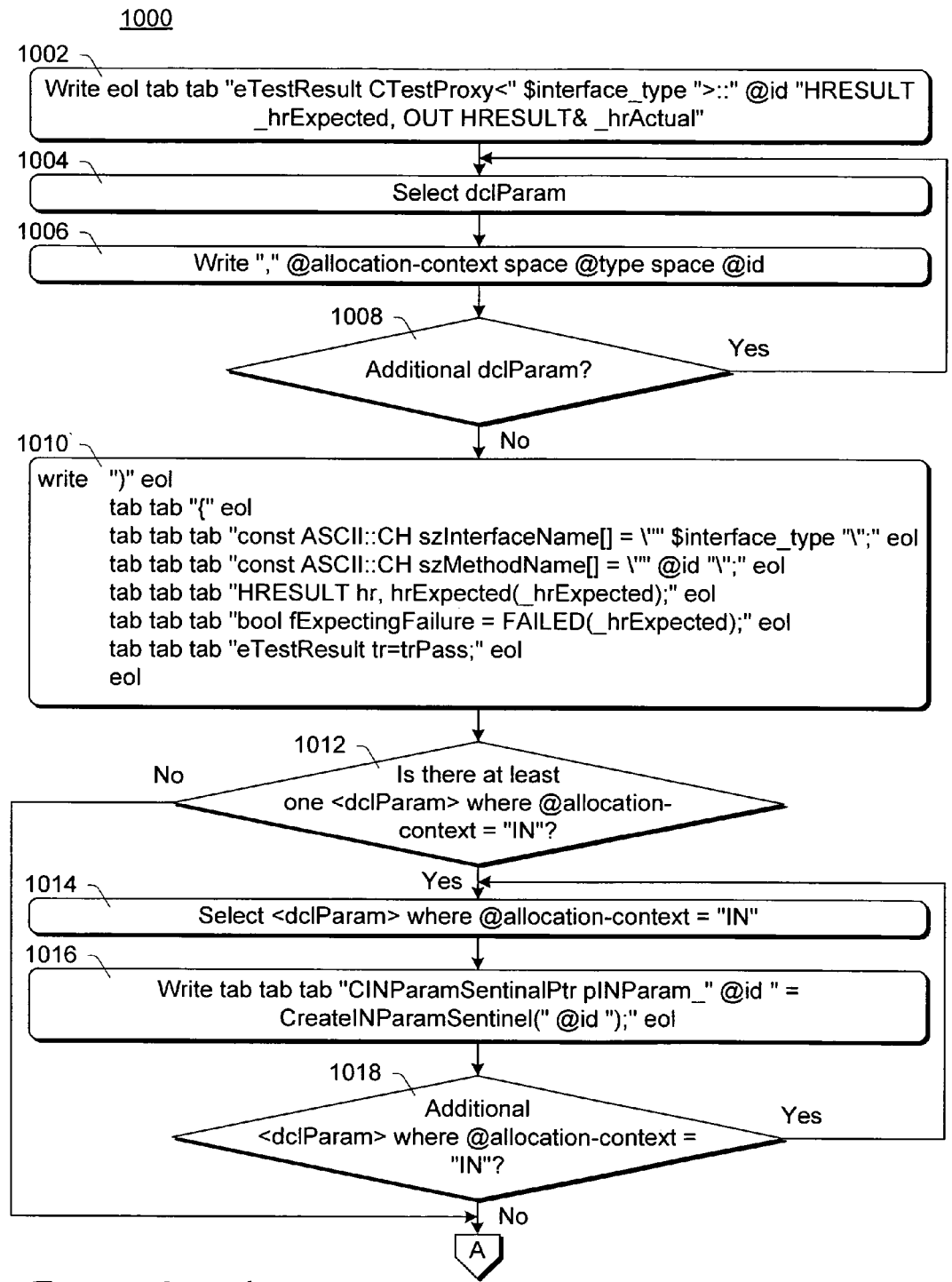
FIGS. 25a, 25b, 25c, and 25d are a flowchart illustrating an exemplary process for transforming a dclMethod construct to a test proxy method definition.
Figure 25B:
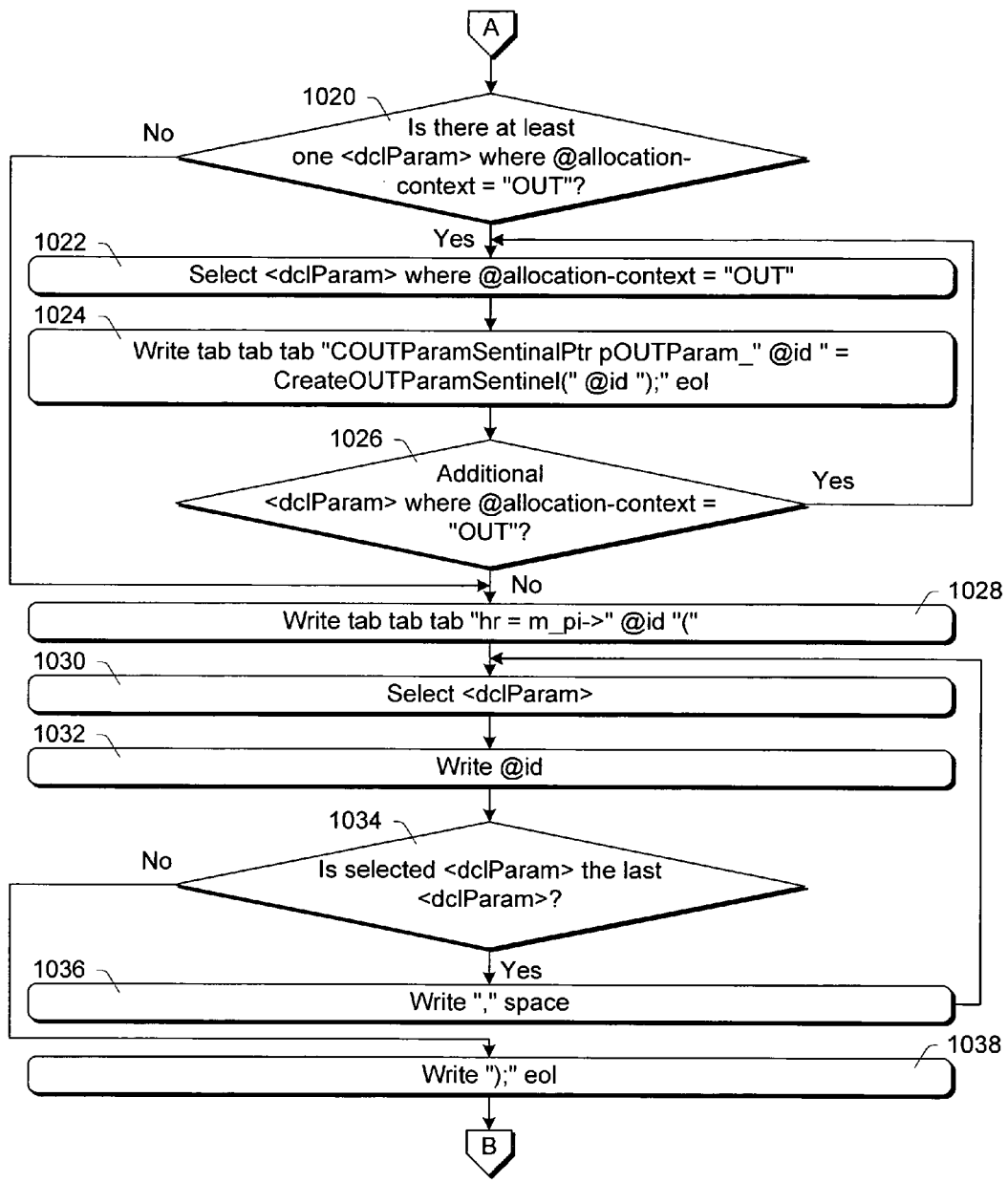
Figure 25C:
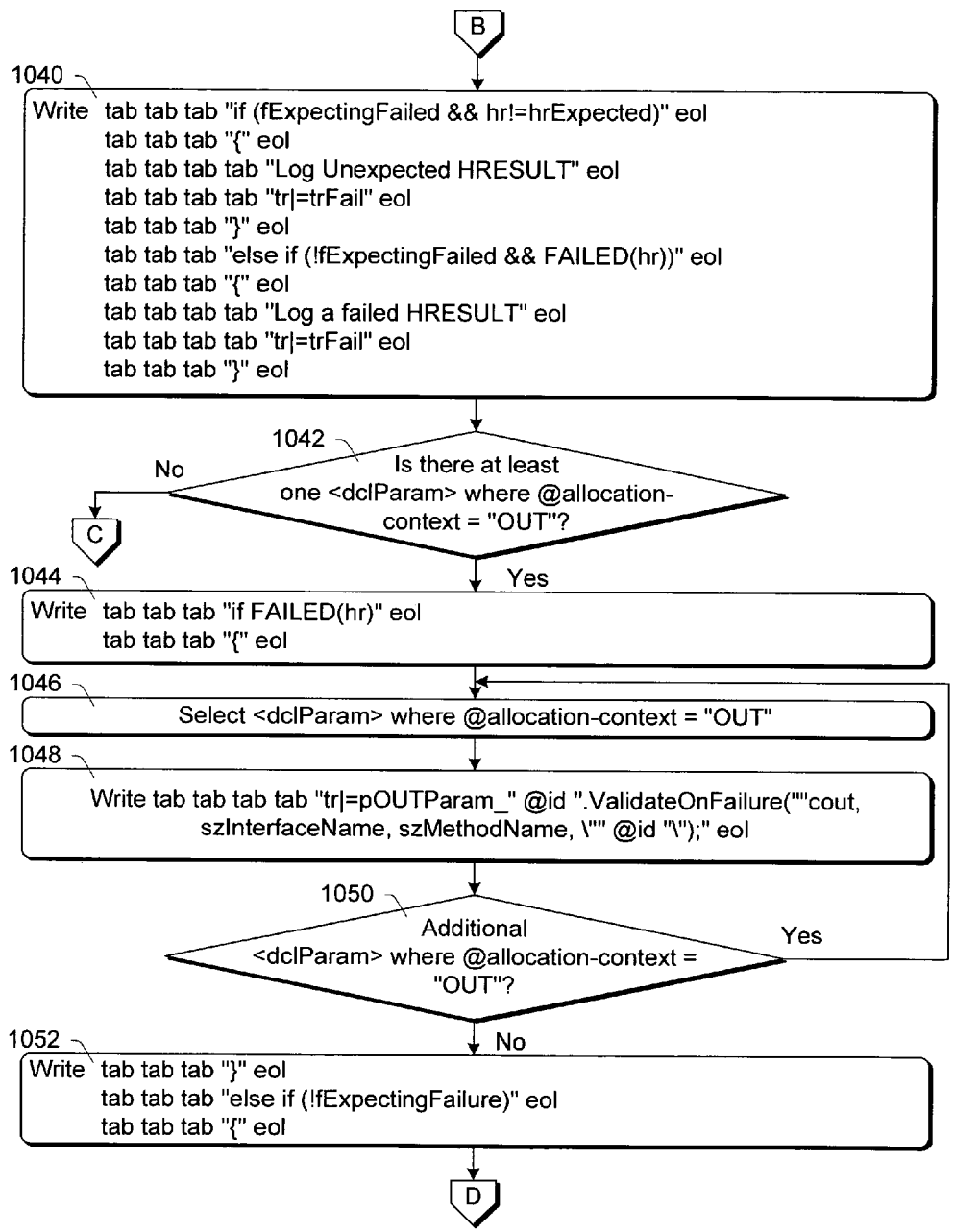

If there are no additional dclParam constructs in the dclMethod construct with the value of the @allocation-context attribute being "IN" (act 1018), or if there are no dclParam constructs in the dclMethod construct with the value of the @allocation-context attribute being "IN" (act 1012), then processing proceeds to check whether there is at least one dclParam construct in the dclMethod construct (construct 270 of FIG. 3) with the value of the @allocation-context attribute (attribute 276 of FIG. 3) being "OUT" (act 1020 of FIG. 25B). If there is at least one such dclParam construct, then one such dclParam construct is selected (act 1022), and the following is written to the output file in act 1024: tab tab tab "COUTParamSentinalPtr pOUTParam_" @id "=CreateOUTParamSentinel(" @id ");" eol. In act 1024, @id refers to the id attribute of the dclParam construct selected in act 1022 (attribute 272 of FIG. 3).

A check is then made as to whether there are any additional dclParam constructs in the dclMethod construct with the value of the @allocation-context attribute being "OUT" that have not yet been selected in act 1022 (act 1026). If there are any additional dclParam constructs in the dclMethod construct with the value of the @allocation-context attribute being "OUT" that have not yet been selected in act 1022, then processing returns to act 1022 to select one of the additional dclParam constructs.

If there are no additional dclParam constructs in the dclMethod construct with the value of the @allocation-context attribute being "OUT" (act 1026), or if there are no dclParam constructs in the dclMethod construct with the value of the @allocation-context attribute being "OUT" (act 1020), then the following is written to the output file in act 1028: tab tab tab "hr=m_pi->" @id "(". In act 1028, @id refers to the id attribute of the dclParam construct (attribute 272 of FIG. 3).

One of the dclParam constructs of the dclMethod constructs is then selected (act 1030). The value of @id is then written to the output file (act 1032), where the value of @id refers to the value of the id attribute of the dlcParam construct of the dclMethod construct (attribute 272 of FIG. 3). A check is then made as to whether all of the dclParam constructs in the dclMethod construct have been selected in act 1030 (act 1034). If there are additional dclParam constructs in the dclMethod construct that have not been selected yet in act 1030, then a comma and space are written to the output file (act 1036), and processing returns to act 1030 to select one of such dclParam constructs.

Once all of the dclParam constructs in the dclMethod construct have been selected in act 1030, a closing parenthesis, semicolon, and eol are written to the output file (act 1038). Additional information is then written to the output file (act 1040 of FIG. 25*c*). A check is then again made as to whether there is at least one dclParam construct in the dclMethod construct (construct 270 of FIG. 3) with the value of the @allocation-context attribute (attribute 276 of FIG. 3) being "OUT" (act 1042). If there is at least one such dclParam construct, then additional information is written to the output file (act 1044), and one such dclParam construct is selected (act 1046). The following is then written to the output file in act 1048: tab tab tab tab "trl=pOUTParam_" @id ".ValidateOnFailure("" cout, szInterfaceName, szMethodName, \"" @id "\");" eol. In act 1048, @id refers to the value of the id attribute of the dclParam construct selected in act 1046 (attribute 272 of FIG. 3).

A check is then made as to whether there are any additional dclParam constructs in the dclMethod construct with the value of the @allocation-context attribute being "OUT" that have not yet been selected in act 1046 (act 1050). If there are any additional dclParam constructs in the dclMethod construct with the value of the @allocation-context attribute being "OUT" that have not yet been selected in act 1046, then processing returns to act 1046 to select one of the additional dclParam constructs. However, if there are no additional dclParam constructs in the dclMethod construct with the value of the @allocation-context attribute being "OUT", then additional information is written to the output file (act 1052).

Figure 25D:
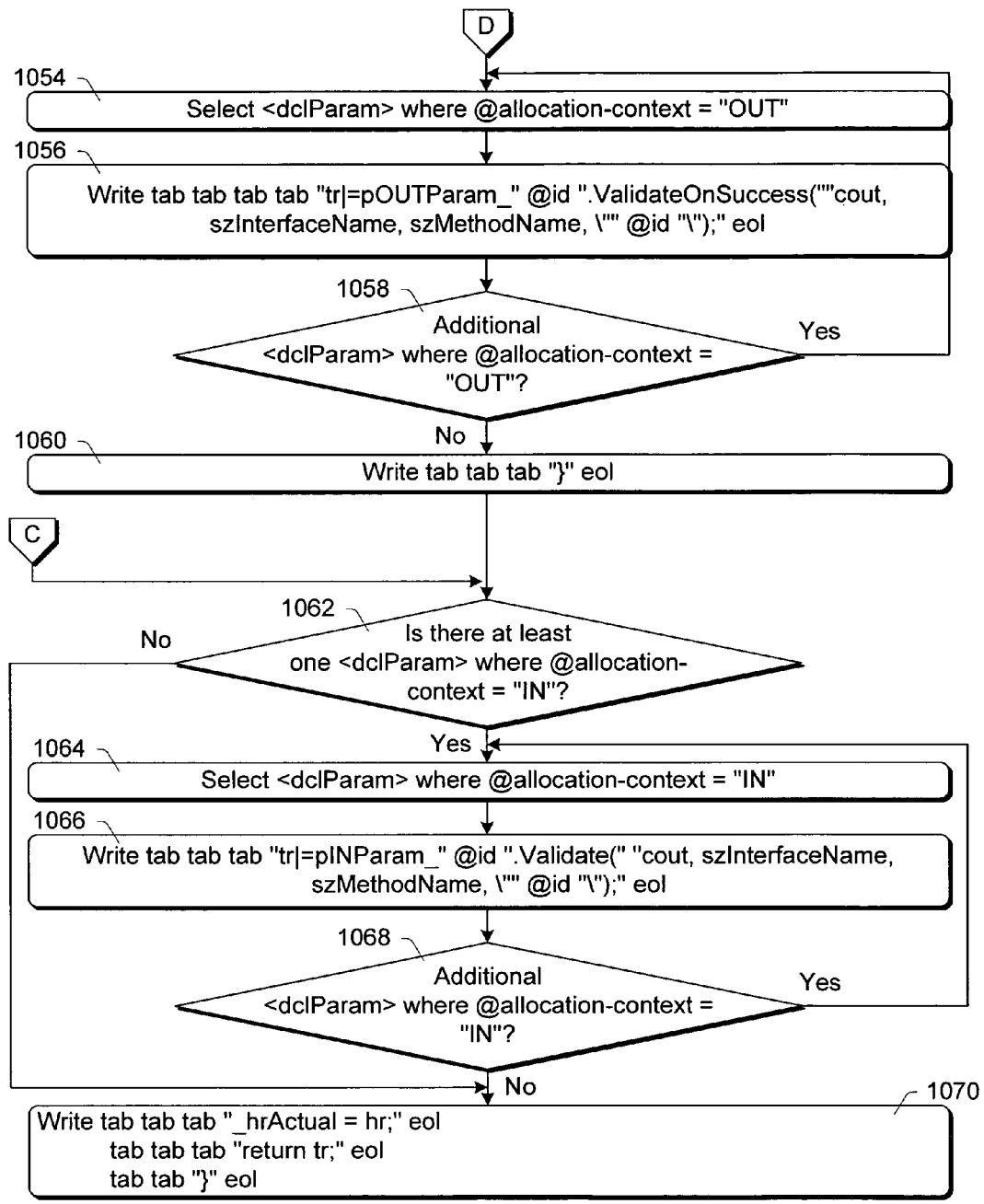

A dclParam construct in the dclMethod construct with the value of the @allocation-context attribute being "OUT" is then again selected (act 1054 of FIG. 25*d*). The following is then written to the output file in act 1056: tab tab tab tab "trl=pOUTParam_" @id ".ValidateOnSuccess("" cout, szInterfaceName, szMethodName, \"" @id "\");" eol. In act 1056, @id refers to the value of the id attribute of the selected dclParam construct of the dclMethod construct (attribute 272 of FIG. 3). A check is then made as to whether there are any additional dclParam constructs in the dclMethod construct with the value of the @allocation-context attribute being "OUT" that have not yet been selected in act 1054 (act 1058). If there are any additional dclParam constructs in the dclMethod construct with the value of the @allocation-context attribute being "OUT" that have not yet been selected in act 1054, then processing returns to act 1054 to select one of the additional dclParam constructs. Otherwise, three tabs, a closing bracket, and an eol are written to the output file (act 1060).

After act 1060, or if there were no dclParam constructs in the dclMethod construct with the value of the @allocation-context attribute being "OUT" in act 1042, then a check is made as to whether there is at least one dclParam construct in the dclMethod construct (construct 270 of FIG. 3) with the value of the @allocation-context attribute (attribute 276 of FIG. 3) being "IN" (act 1062). If there is at least one such dclParam construct, then one such dclParam construct is selected (act 1064), and the following is written to the output file in act 1066: tab tab tab "trl=pINParam_" @id ".Validate(" "cout, szInterfaceName, szMethodName, \"" @id "\");" eol. In act 1066, @id refers to the id attribute of the selected dclParam construct (attribute 272 of FIG. 3). A check is then made as to whether there are any additional dclParam constructs in the dclMethod construct with the value of the @allocation-context attribute being "IN" that have not yet been selected in act 1064 (act 1068). If there are any additional dclParam constructs in the dclMethod construct with the value of the @allocation-context attribute being "IN" that have not yet been selected in act 1064, then processing returns to act 1064 to select one of the additional dclParam constructs.

If there are no additional dclParam constructs in the dclMethod construct with the value of the @allocation-context attribute being "IN" (act 1068), or if there are no dclParam constructs in the dclMethod construct with the value of the @allocation-context attribute being "IN" (act 1062), then processing proceeds to write closing information to the output file (act 1070).

Table XLII below shows the example dclMethod construct of Table XL above transformed using the process of FIGS. 25*a*-25*d*.

TABLE XLII

```
eTestResult CTestProxy< IZoneStat >::GetReportStatus(HRESULT __hr-
Expected, OUT HRESULT& __hrActual, OUT DWORD* pdwStatus)
{
    const ASCII::CH szInterfaceName[ ] = "IZoneStat";
    const ASCII::CH szMethodName[ ] = "GetReportStatus";
    CZoneStatHRESULT hr, hrExpected(__hrExpected);
    bool fExpectingFailure = FAILED(__hrExpected);
    eTestResult tr=trPass;
    // Declare/Initialize OUT-Parameter sentinals
    COUTParamSentinelPtr pOUTParam__pdwStatus =
CreateOUTParamSentinel(pdwStatus);
    hr = m__pi->GetReportStatus(pdwStatus);
    IfCondition(fExpectingFailure && hr!=hrExpected,
EUnexpectedResult(hrExpected, hr, szInterfaceName, szMethodName))
        tr=trFail;
    else IfCondition(!fExpectingFailure && FAILED(hr),
EFailedHRESULT(hr, szInterfaceName, szMethodName))
        tr=trFail;
    if (FAILED(hr))
    {
        tr=pOUTParam__pdwStatus.ValidateOnFailure(xout,
szInterfaceName, szMethodName, "pdwStatus");
    }
    else if (!fExpectingFailure)
    {
        tr=pOUTParam__pdwStatus.ValidateOnSuccess(xout,
```

TABLE XLII-continued

```
szInterfaceName, szMethodName, "pdwStatus");
   }
   _hrActual = hr;
   return tr;
}
```

FIGS. 21-25d above describe the generation of test proxy objects for dclInterface constructs including dclMethod constructs. Any dclFunction constructs can be transformed to test proxy objects analogous to the transformation of the dclMethod constructs discussed above.

After generating the test proxy objects, a support library may also be used by the test proxy objects to ameliorate the task of checking whether an API function has or has not complied with the given contract of behavior. This support library provides sentinel objects that are used to determine if a given parameter value has been changed. Table XLIII below illustrates an example support library that may be used by the test proxy objects.

TABLE XLIII

```
class CINParamSentinelBase
{
public:
    virtual ~CINParamSentinelBase( ) { }
    virtual eTestResult Validate(XMLUty::xml_ostream& xout, ASCII::PCSZ
pszInterfaceName, ASCII::PCSZ pszMethodName, ASCII::PCSZ pszParameterName) = 0;
    virtual eTestResult Validate(XMLUty::xml_ostream& xout, ASCII::PCSZ
pszFunctionName, ASCII::PCSZ pszParameterName) = 0;
};
class CINParamSentinelPtr
{
public:
    CINParamSentinelPtr(CINParamSentinelBase* p)
       : m_p(p) { }
    ~CINParamSentinelPtr( ) { if (m_p!=NULL) delete m_p; }
    CINParamSentinelBase* operator-> ( ) { return m_p; }
    CINParamSentinelBase* m_p;
    inline  eTestResult  Validate(XMLUty::xml_ostream&  xout,  ASCII::PCSZ
pszInterfaceName, ASCII::PCSZ pszMethodName, ASCII::PCSZ pszParameterName)
    {
        return m_p==NULL  ?  trPass  :  m_p->Validate(xout,  pszInterfaceName,
pszMethodName, pszParameterName);
    }
    inline  eTestResult  Validate(XMLUty::xml_ostream&  xout,  ASCII::PCSZ
pszFunctionName, ASCII::PCSZ pszParameterName)
    {
        return  m_p==NULL  ?  trPass  :  m_p->Validate(xout,  pszFunctionName,
pszParameterName);
    }
};
template <class T>
class CINParamSentinel : public CINParamSentinelBase
{
public:
    T m_OriginalValue;
    T* m_pInputValue;
    CINParamSentinel(T* p)
       : m_pInputValue(p)
    {
       if (m_pInputValue!=NULL)
          memcpy(&m_OriginalValue, m_pInputValue, sizeof(T));
    }
    inline bool IsNULL( )
    {
       return m_pInputValue==NULL;
    }
    inline bool DidChange( )
    {
       if (m_pInputValue==NULL)
          return false;
       return 0!=memcmp(&m_OriginalValue, m_pInputValue, sizeof(T));
    }
    eTestResult  Validate(XMLUty::xml_ostream&  xout,  ASCII::PCSZ
pszInterfaceName, ASCII::PCSZ pszMethodName, ASCII::PCSZ pszParameterName)
    {
       if (DidChange( ))
       {
          xout << EChangedInParamFailure(pszInterfaceName, pszMethodName,
pszParameterName, m_OriginalValue, *m_pInputValue);
          return trFail;
       }
       return trPass;
    }
    eTestResult  Validate(XMLUty::xml_ostream&  xout,  ASCII::PCSZ
```

TABLE XLIII-continued

```
pszFunctionName, ASCII::PCSZ pszParameterName)
    {
        if (DidChange( ))
        {
            xout    <<   EChangedInParamFailure(pszFunctionName,
pszParameterName, m_OriginalValue, *m_pInputValue);
            return trFail;
        }
        return trPass;
    }
};
inline CINParamSentinelBase* CreateINParamSentinel(DWORD)
{
    return NULL;
}
template <class T>
inline CINParamSentinelBase* CreateINParamSentinel(T* pInParam)
{
    return new CINParamSentinel<T>(pInParam);
}
// Macro - SPECIALIZE_INParamSentinel
// =================================
// Unfortunately, there's no way to specify a template for a subset of
// classes-- therefore an explicit macro is required.
//
// For Interface Pointers:
// IN parameters that are interface pointers need no validation
// In the future, we may want to create and pass IN a proxy
// object to ensure that IN semantics are kept with regard to
// reference counting. For now, no IN parameter validation
// needs to be performed on IN Interface pointers
#define SPECIALIZE_CreateINParamSentinel(INTERFACE) \
template < > \
inline CINParamSentinelBase* CreateINParamSentinel<INTERFACE>(INTERFACE*) \
{ \
    return NULL; \
}
SPECIALIZE_CreateINParamSentinel(IUnknown);
class COUTParamSentinelBase
{
public:
    virtual ~COUTParamSentinelBase( ) { }
    virtual bool IsNULL( ) = 0;
    virtual bool IsValueNull( ) = 0;
    virtual bool DidChange( )=0;
    eTestResult   ValidateOnFailure(XMLUty::xml_ostream&   xout,   ASCII::PCSZ
pszInterfaceName, ASCII::PCSZ pszMethodName, ASCII::PCSZ pszParameterName);
    eTestResult   ValidateOnFailure(XMLUty::xml_ostream&   xout,   ASCII::PCSZ
pszFunctionName, ASCII::PCSZ pszParameterName);
    eTestResult   ValidateOnSuccess(XMLUty::xml_ostream&   xout,   ASCII::PCSZ
pszInterfaceName, ASCII::PCSZ pszMethodName, ASCII::PCSZ pszParameterName);
    eTestResult   ValidateOnSuccess(XMLUty::xml_ostream&   xout,   ASCII::PCSZ
pszFunctionName, ASCII::PCSZ pszParameterName);
};
class COUTParamSentinelPtr
{
public:
    COUTParamSentinelPtr(COUTParamSentinelBase* p)
        : m_p(p) { }
    ~COUTParamSentinelPtr( ) { if (m_p!=NULL) delete m_p; }
    COUTParamSentinelBase* operator-> ( ) { return m_p; }
    COUTParamSentinelBase* m_p;
    eTestResult   ValidateOnFailure(XMLUty::xml_ostream&   xout,   ASCII::PCSZ
pszInterfaceName, ASCII::PCSZ pszMethodName, ASCII::PCSZ pszParameterName)
    {
        return   m_p==NULL   ?   trPass   :   m_p->ValidateOnFailure(xout,
pszInterfaceName, pszMethodName, pszParameterName);
    }
    eTestResult   ValidateOnSuccess(XMLUty::xml_ostream&   xout,   ASCII::PCSZ
pszInterfaceName, ASCII::PCSZ pszMethodName, ASCII::PCSZ pszParameterName)
    {
        return   m_p==NULL   ?   trPass   :   m_p->ValidateOnSuccess(xout,
pszInterfaceName, pszMethodName, pszParameterName);
    }
    eTestResult   ValidateOnFailure(XMLUty::xml_ostream&   xout,   ASCII::PCSZ
pszFunctionName, ASCII::PCSZ pszParameterName)
    {
        return   m_p==NULL   ?   trPass   :   m_p->ValidateOnFailure(xout,
```

TABLE XLIII-continued

```
pszFunctionName, pszParameterName);
    }
    eTestResult  ValidateOnSuccess(XMLUty::xml_ostream&  xout,  ASCII::PCSZ
pszFunctionName, ASCII::PCSZ pszParameterName)
    {
      return  m_p==NULL  ?  trPass  :  m_p->ValidateOnSuccess(xout,
pszFunctionName, pszParameterName);
    }
  };
  template <class T>
  class COUTParamSentinel : public COUTParamSentinelBase
  {
  public:
     T m_OriginalValue;
     T* m_pInputValue;
     COUTParamSentinel(T* p)
       : m_pInputValue(p)
     {
       if (m_pInputValue!=NULL)
          memcpy(&m_OriginalValue, m_pInputValue, sizeof(T));
     }
     virtual bool IsNULL( )
     {
       return m_pInputValue==NULL;
     }
     virtual bool DidChange( )
     {
       if (m_pInputValue==NULL)
          return false;
       return 0!=memcmp(&m_OriginalValue, m_pInputValue, sizeof(T));
     }
     virtual bool IsValueNull( );
  };
  // Default implementation of COUTParamSentinel<T>::IsValueNull
  template <class T>
  inline bool COUTParamSentinel<T>::IsValueNull( )
  {
     return false;
  }
  // Macro: SPECIALIZE_OUTParamSentinel
  // =====================================
  // Interfaces get their own special behavior
  // Since there's no way in C++ to specify only interfaces for a
  // template parameter, we have to use a Macro.
  #define SPECIALIZE_OUTParamSentinel(TINTERFACE) \
  template < > \
  inline bool COUTParamSentinel<TINTERFACE*>::IsValueNull( ) \
  { \
     return m_pInputValue!=NULL && *m_pInputValue==NULL; \
  }
  template <class T>
  inline COUTParamSentinel<T>* CreateOUTParamSentinel(T* pOutParam)
  {
     return new COUTParamSentinel<T>(pOutParam);
  }
  class CTestProxyBase
  {
  public:
     CTestProxyBase(IUnknown* punk, XMLUty::xml_ostream& target, ASCII::PCSZ
pszInterfaceName)
       : m_punk(punk), m_xout(target), m_pszInterfaceName(pszInterfaceName)
     {
     }
     void Assign(IN IUnknown* pi)
     {
       m_punk = pi;
     }
     void Assign(IN ComUty::CComPointer<IUnknown>& pi)
     {
       m_punk = pi;
     }
  protected:
     XMLUty::xml_ostream& m_xout;
     ComUty::CComPointer<IUnknown> m_punk;
     ASCII::PCSZ m_pszInterfaceName;
  };
  template <class TInterface>
  class _CTestProxy : public CTestProxyBase
  {
```

TABLE XLIII-continued

```
public:
    typedef CTestProxyBase inherited;
    typedef ComUty::CComPointer<TInterface> com_ptr_type;
    _CTestProxy(com_ptr_type& pi, XMLUty::xml_ostream& target, ASCII::PCSZ pszInterfaceName)
        : CTestProxyBase(pi.AsInparam( ), target, pszInterfaceName), m_pi(pi)
    {
    }
    _CTestProxy(TInterface* pi, XMLUty::xml_ostream& target, ASCII::PCSZ pszInterfaceName)
        : CTestProxyBase(pi, target, pszInterfaceName), m_pi(pi)
    {
    }
    void Assign(IN TInterface* pi)
    {
        inherited::Assign(pi);
        m_pi = pi;
    }
    void Assign(IN ComUty::CComPointer<TInterface>& pi)
    {
        inherited::Assign(pi.AsInParam( ));
        m_pi = pi;
    }
protected:
    ComUty::CComPointer<TInterface> m_pi;
};
template <class TInterface>
class CTestProxy : public _CTestProxy<TInterface>
{
    // note: this class is specialized within generate code
};
```

Additionally, other types of proxy objects may also be generated using different transformations. For example, logging proxy objects may be generated that record calls to an external log file. The transformation process for generating logging proxy objects is analogous to that for generating text proxy objects discussed above with reference to FIGS. 21 through 25d, except that rather than performing any tests in response to received calls, the calls are simply recorded to the external log file.

Various other transformations in addition to those discussed above may also be performed on APISL document 102 of FIG. 1. These additional transformations may use the information stored in the attributes and constructs illustrated in FIG. 3, or alternatively may use additional information. By way of example, an alternative structure for the APISL than that illustrated in FIG. 3 would expand the structure of FIG. 3 so that each construct included a "description" attribute. This description attribute would allow the designer to enter descriptive information regarding each construct. The document could then be transformed into an API COM header file as discussed above, as well as documentation for the API COM header file. The documentation can be generated by using a transformation process that collects the values of the various description attributes and generates an output file that includes the collected values appropriately (e.g., alphabetically, in order of appearance of the corresponding constructs in the API COM header file, etc.).

General Computer Environment

Figure 26:
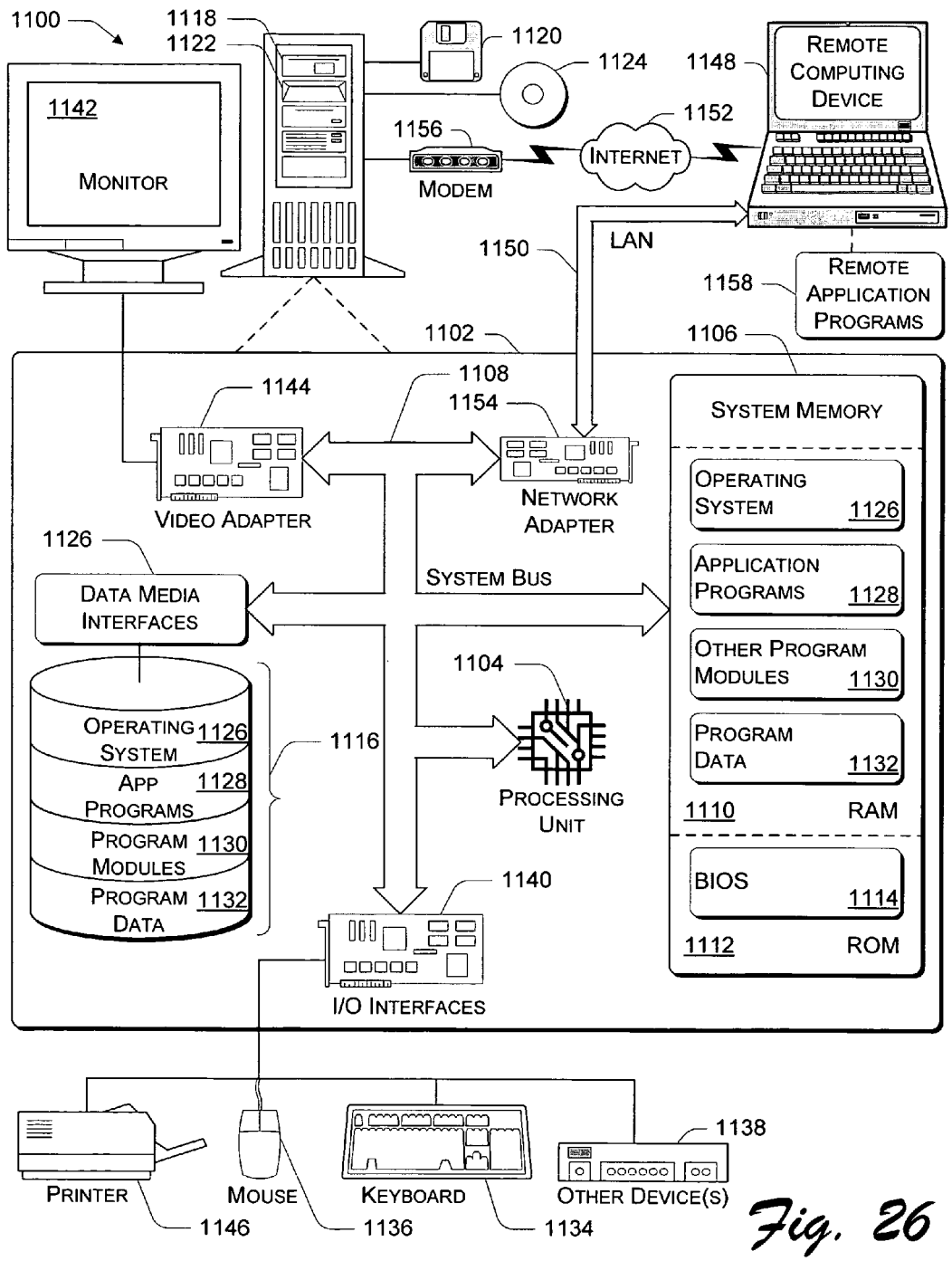
FIG. 26 illustrates a general computer environment which can be used to implement the API Schema Language and transformation techniques described herein.

FIG. 26 illustrates a general computer environment 1100, which can be used to implement the API Schema Language and transformation techniques described herein. The computer environment 1100 is only one example of a computing environment and is not intended to suggest any limitation as to the scope of use or functionality of the computer and network architectures. Neither should the computer environment 1100 be interpreted as having any dependency or requirement relating to any one or combination of components illustrated in the exemplary computer environment 1100.

Computer environment 1100 includes a general-purpose computing device in the form of a computer 1102. Computer 1102 can implement, for example, transformation engine 108 of FIG. 1. The components of computer 1102 can include, but are not limited to, one or more processors or processing units 1104, a system memory 1106, and a system bus 1108 that couples various system components including the processor 1104 to the system memory 1106.

The system bus 1108 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 1102 typically includes a variety of computer readable media. Such media can be any available media that is accessible by computer 1102 and includes both volatile and non-volatile media, removable and non-removable media.

The system memory 1106 includes computer readable media in the form of volatile memory, such as random access memory (RAM) 1110, and/or non-volatile memory, such as read only memory (ROM) 1112. A basic input/output system (BIOS) 1114, containing the basic routines that help to transfer information between elements within computer 1102, such as during start-up, is stored in ROM 1112. RAM 1110 typically contains data and/or program modules that are immediately accessible to and/or presently operated on by the processing unit 1104.

Computer 1102 may also include other removable/non-removable, volatile/non-volatile computer storage media. By way of example, FIG. 26 illustrates a hard disk drive 1116 for reading from and writing to a non-removable, non-volatile magnetic media (not shown), a magnetic disk drive 1118 for reading from and writing to a removable, non-volatile magnetic disk 1120 (e.g., a "floppy disk"), and an optical disk drive 1122 for reading from and/or writing to a removable, non-volatile optical disk 1124 such as a CD-ROM, DVD-ROM, or other optical media. The hard disk drive 1116, magnetic disk drive 1118, and optical disk drive 1122 are each connected to the system bus 1108 by one or more data media interfaces 1126. Alternatively, the hard disk drive 1116, magnetic disk drive 1118, and optical disk drive 1122 can be connected to the system bus 1108 by one or more interfaces (not shown).

The disk drives and their associated computer-readable media provide non-volatile storage of computer readable instructions, data structures, program modules, and other data for computer 1102. Although the example illustrates a hard disk 1116, a removable magnetic disk 1120, and a removable optical disk 1124, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 1116, magnetic disk 1120, optical disk 1124, ROM 1112, and/or RAM 1110, including by way of example, an operating system 1126, one or more application programs 1128, other program modules 1130, and program data 1132. Each of such operating system 1126, one or more application programs 1128, other program modules 1130, and program data 1132 (or some combination thereof) may implement all or part of the resident components that support the distributed file system.

A user can enter commands and information into computer 1102 via input devices such as a keyboard 1134 and a pointing device 1136 (e.g., a "mouse"). Other input devices 1138 (not shown specifically) may include a microphone, joystick, game pad, satellite dish, serial port, scanner, and/or the like. These and other input devices are connected to the processing unit 1104 via input/output interfaces 1140 that are coupled to the system bus 1108, but may be connected by other interface and bus structures, such as a parallel port, game port, or a universal serial bus (USB).

A monitor 1142 or other type of display device can also be connected to the system bus 1108 via an interface, such as a video adapter 1144. In addition to the monitor 1142, other output peripheral devices can include components such as speakers (not shown) and a printer 1146 which can be connected to computer 1102 via the input/output interfaces 1140.

Computer 1102 can operate in a networked environment using logical connections to one or more remote computers, such as a remote computing device 1148. By way of example, the remote computing device 1148 can be a personal computer, portable computer, a server, a router, a network computer, a peer device or other common network node, and the like. The remote computing device 1148 is illustrated as a portable computer that can include many or all of the elements and features described herein relative to computer 1102.

Logical connections between computer 1102 and the remote computer 1148 are depicted as a local area network (LAN) 1150 and a general wide area network (WAN) 1152. Such networking environments are commonplace in offices, enterprise-wide computer networks, intranets, and the Internet.

When implemented in a LAN networking environment, the computer 1102 is connected to a local network 1150 via a network interface or adapter 1154. When implemented in a WAN networking environment, the computer 1102 typically includes a modem 1156 or other means for establishing communications over the wide network 1152. The modem 1156, which can be internal or external to computer 1102, can be connected to the system bus 1108 via the input/output interfaces 1140 or other appropriate mechanisms. It is to be appreciated that the illustrated network connections are exemplary and that other means of establishing communication link(s) between the computers 1102 and 1148 can be employed.

In a networked environment, such as that illustrated with computing environment 1100, program modules depicted relative to the computer 1102, or portions thereof, may be stored in a remote memory storage device. By way of example, remote application programs 1158 reside on a memory device of remote computer 1148. For purposes of illustration, application programs and other executable program components such as the operating system are illustrated herein as discrete blocks, although it is recognized that such programs and components reside at various times in different storage components of the computing device 1102, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

CONCLUSION

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A method comprising:
   receiving an indication of an application programming interface description, wherein the description is written in an extensible markup language (XML) format;
   identifying a plurality of constructs in the application programming interface description; and
   transforming one or more of the plurality of constructs into code for a component object module (COM) application programming interface header file, wherein the transforming comprises transforming a declare enumeration construct into a series of manifest constants.

2. A method as recited in claim 1, wherein the code for the component object module comprises C source code.

3. A method as recited in claim 1, wherein the code for the component object module comprises C++ source code.

4. A method as recited in claim 1, wherein the transforming further comprises transforming another declare enumeration construct into a component object model enumeration declaration.

5. A method as recited in claim 1, wherein the transforming further comprises transforming a declare function construct into a component object model function declaration.

6. A method as recited in claim 1, wherein the transforming further comprises transforming a declare class object construct into a component object model class object ID declaration.

7. A method as recited in claim 1, wherein the transforming further comprises transforming a declare interface construct into a component object model forward class declaration.

8. A method as recited in claim 1, wherein the transforming further comprises transforming a declare data structure construct into a component object model data structure declaration.

9. A method as recited in claim 1, wherein the transforming further comprises transforming a declare macro construct into a component object model manifest constant.

10. A computer system comprising:
    one or more processors;
    instructions executable by the one or more processors including:
      instructions for receiving an indication of an application programming interface description, wherein the description is written in an extensible markup language (XML) format;
      instructions for identifying a plurality of constructs in the application programming interface description; and
      instructions for transforming one or more of the plurality of constructs into code for a component object module (COM) application programming interface header file, wherein the transforming comprises transforming a declare enumeration construct into a series of manifest constants.

11. A computer system as recited in claim 10, wherein the instructions executable by the one or more processors further comprise instructions for transforming another declare enumeration construct into a component object model enumeration declaration.

12. A computer system as recited in claim 10, wherein the instructions executable by the one or more processors further comprise instructions for transforming a declare function construct into a component object model function declaration.

13. A computer system as recited in claim 10, wherein the instructions executable by the one or more processors further comprise instructions for transforming a declare class object construct into a component object model class object ID declaration.

14. A computer system as recited in claim 10, wherein the instructions executable by the one or more processors further comprise instructions for transforming a declare interface construct into a component object model forward class declaration.

15. A computer system as recited in claim 10, wherein the instructions executable by the one or more processors further comprise instructions for transforming a declare data structure construct into a component object model data structure declaration.

16. A computer system as recited in claim 10, wherein the instructions executable by the one or more processors further comprise instructions for transforming a declare macro construct into a component object model manifest constant.

17. One or more computer storage media having stored thereon a plurality of instructions executable by one or more processors to perform acts comprising:
    receiving an indication of an application programming interface description, wherein the description is written in an extensible markup language (XML) format;
    identifying a plurality of constructs in the application programming interface description; and
    transforming one or more of the plurality of constructs into code for a component object module (COM) application programming interface header file, wherein the transforming comprises transforming a declare enumeration construct into a series of manifest constants.

18. One or more computer storage media as recited in claim 17, wherein the transforming further comprises transforming another declare enumeration construct into a component object model enumeration declaration.

19. One or more computer storage media as recited in claim 17, wherein the transforming further comprises transforming a declare function construct into a component object model function declaration.

20. One or more computer storage media as recited in claim 17, wherein the transforming further comprises transforming a declare class object construct into a component object model class object ID declaration.

* * * * *